(12) United States Patent
Nakagawa et al.

(10) Patent No.: US 7,806,412 B2
(45) Date of Patent: Oct. 5, 2010

(54) LIP TYPE END FACE SEALING DEVICE

(75) Inventors: Takehiro Nakagawa, Fukushima (JP); Akihiro Sato, Fukushima (JP); Tetsuo Tasaki, Fukushima (JP); Hiromi Takahashi, Fukushima (JP); Junya Hoshi, Fukushima (JP); Hiroshi Okubo, Fukushima (JP); Masahiro Anzai, Fukushima (JP)

(73) Assignee: NOK Corporation, Tokyo (JP)

( * ) Notice: Subject to any disclaimer, the term of this patent is extended or adjusted under 35 U.S.C. 154(b) by 524 days.

(21) Appl. No.: 11/631,899

(22) PCT Filed: Jun. 16, 2005

(86) PCT No.: PCT/JP2005/011015

§ 371 (c)(1),
(2), (4) Date: Jan. 8, 2007

(87) PCT Pub. No.: WO2006/006338

PCT Pub. Date: Jan. 19, 2006

(65) Prior Publication Data

US 2008/0029967 A1 Feb. 7, 2008

(30) Foreign Application Priority Data

Jul. 9, 2004 (JP) .............................. 2004-202684

(51) Int. Cl.
*F16J 15/32* (2006.01)

(52) U.S. Cl. .................................................... 277/552

(58) Field of Classification Search ................. 277/346, 277/549, 551, 552, 559, 562, 572, 577, 423, 277/353, 349, 563, 918
See application file for complete search history.

(56) References Cited

U.S. PATENT DOCUMENTS 4,986,552 A * 1/1991 Anzue et al. ................. 277/348

6,561,519 B1 * 5/2003 Frese et al. .................. 277/549
2004/0201179 A1 * 10/2004 Iwakata et al. .............. 277/572

FOREIGN PATENT DOCUMENTS

JP S59-59575 4/1984

(Continued)

OTHER PUBLICATIONS

International Search Report (in English) for PCT/JP2005/011015, ISA/JP, mailed Sep. 27, 2005.
Written Opinion of the International Search Authority (in Japanese) for PCT/JP2005/011015, ISA/JP, mailed Sep. 27, 2005.

*Primary Examiner*—Vishal Patel
*Assistant Examiner*—Gilbert Y Lee
(74) *Attorney, Agent, or Firm*—Harness, Dickey & Pierce, P.L.C.; Ronald W. Wangerow, Esq.

(57) ABSTRACT

An objective of the present invention is to provide a lip type end face sealing device 6 having excellent sealability to different kinds of liquids on the both sides in the axial direction and having excellent durability. A case 61 tight fitted to an inner peripheral face 2a of a housing 2 comprises case members 611 and 612. One pair of seal lips 62 and 63 is integrally fitted to inner peripheral flange parts 611b and 612b, positioned oppositely each other in the axial direction, and opened in a tapered shape. One pair of the seal lips 62 and 63 is slidably contacted with flange parts 64b and 65b of slingers 64 and 65 tight fitted to an outer periphery of a rotary shaft 3. Pressure in seal internal spaces S2 between the both seal lips 62 and 63 and the both slingers 64 and 65 is released through a vent hole 22 opened on the inner peripheral face 2a of the housing 2, an air hole 611c opened on the case 61, and between the case members 611 and 612.

7 Claims, 9 Drawing Sheets

FOREIGN PATENT DOCUMENTS

| | | |
|---|---|---|
| JP | S59-85460 | 6/1984 |
| JP | S60-107457 | 7/1985 |
| JP | S60-133274 | 9/1985 |
| JP | S61-61371 | 4/1986 |
| JP | H2-65764 | 5/1990 |
| JP | H5-19739 | 3/1993 |
| JP | H6-49856 | 7/1994 |
| JP | H6-73543 | 10/1994 |
| JP | H7-2676 | 1/1995 |
| JP | 2001-355740 | 12/2001 |
| JP | 2003-287142 A | 10/2003 |
| JP | 2003287142 * | 10/2003 |

* cited by examiner

LIP TYPE END FACE SEALING DEVICE

This is a nationalization of the International Patent Application No. PCT/JP2005/011015 filed Jun. 16, 2005 and published in Japanese.

BACKGROUND OF THE INVENTION

1. Field of the Invention

The present invention relates to a lip type end face sealing device in which a seal lip is tight contacted with an end face to carry out sealing.

2. Description of the Conventional Art

For example, Japanese Utility Model Laid-Open No. 6(1994)-49856 discloses a typical conventional sealing device for tight sealing between engine oil and clutch oil in a wet type engine.

FIG. 16 is a half cross-sectional view illustrating a conventional sealing device 100 which is similar to a device illustrated in FIG. 5 in the above-described patent document. That is, the sealing device 100 is made of a rubber-like elastic material and formed in an annular metal case 101 which is pressed-in and fitted to an inner peripheral face of a housing 120. The sealing device 100 includes a pair of radial seal lips 102 and 103 which are positioned oppositely to each other in the axial direction. Extension springs 104 and 105 for giving fastening force to a rotary shaft 130 are mounted on outer peripheries of the radial seal lips 102 and 103. The one radial seal lip 102 is for sealing engine oil, and the other radial seal lip 103 is for sealing clutch oil.

However, as for the sealing device 100 illustrated in FIG. 16, the radial seal lips 102 and 103 have the comparatively short life since being abraded by the fastening force to the rotary shaft 130. Further, when the radial seal lips 102 and 103 are mounted in the slight eccentric state to the rotary shaft 130, parts at circumferential directional sides of the radial seal lips 102 and 103 have too low sliding face pressures to the rotary shaft 130 or some spaces between these seal lips and the rotary shaft 130 are generated, so that different liquids at both axial sides may be mixed each other. Further, when the radial seal lips 102 and 103 are fitted on the rotary shaft 103 to be mounted, meticulous care is needed not to damage the radial seal lips 102 and 103.

Further, for solving such the problem, an end face sealing type end face sealing device as illustrated in FIG. 1 in the above-described patent document has been developed in recent years. In this end face sealing device, a seal lip is slidably contacted with an end face of a slinger which is vertical to an axis of a shaft. However, as for the end face sealing type, a negative pressure is caused in the seal internal space by centrifugal force at the time of rotation, where the space is tight closed by both seal lip sliding parts. Thus, the seal lip is entirely contacted with the end face of the slinger so as to increase sliding load. As a result, sealability may be decreased.

SUMMARY OF THE INVENTION

The present invention solves the above-described problems, and an objective of the present invention is to provide a lip type end face sealing device having excellent sealability and excellent durability.

In order to effectively solve the above-described technical problems, a lip type end face sealing device according to a first aspect of the invention comprises a pair of seal lips being integrally fitted to an annular case fixed on an inner peripheral face of a housing, being positioned oppositely to each other in the axial direction, and being opened in a tapered shape; a pair of slingers being tight fitted to an outer periphery of a rotary shaft inserted into the inner periphery of the housing and being slidably contacted with the respective seal lips at flange parts; and a vent passage for releasing pressure in a seal internal space between sliding parts of the both seal lips and the both slingers. Therefore, even when air is discharged from the seal internal space between the sliding parts of the both seal lips and the both slingers by centrifugal force at the time of the rotation of the slingers, the pressure does not become negative.

The lip type end face sealing device according to a second aspect of the invention has, in addition to the constitution of the first aspect, a constitution that the case comprises a pair of case members and the vent passage comprises a vent hole opened on the inner peripheral face of the housing; and an air hole being opened at a fitting face with the inner peripheral face of the housing in the case so as to face between the pair of case members and being conducted to the vent hole. That is, the device includes such a constitution as to release the pressure in the seal internal space between the sliding parts of the both seal lips and the both slingers from a space between the pair of case members constituting the case through the air hole of the case and the vent hole of the housing.

The lip type end face sealing device according to a third aspect of the invention has, in addition to the constitution of the first aspect, a constitution that the vent passage comprises a vent hole opened on the inner peripheral face of the housing; and a vent tube of which one end is connected with the vent hole and another end is conducted to the seal internal space between the sliding parts of the both seal lips and the both slingers. That is, the device includes such a constitution as to release the pressure in the seal internal space between the sliding parts of the both seal lips and the both slingers, from the vent tube through the vent hole of the housing.

The lip type end face sealing device according to a fourth aspect of the invention has, in addition to the constitution of the first aspect, a constitution that the one seal lip is for sealing liquid and the other seal lip is for sealing dust at the atmosphere side, the vent passage is formed at the slinger, and the seal internal space between the sliding parts of the both seal lips and the both slingers is conducted to the atmosphere side through a dust filter. Therefore, the vent passage does not need to be formed on the housing side, and the air sucked into the internal space between the sliding parts of the both seal lips and the both lingers is filtrated by the dust filter.

A lip type end face sealing device according to a fifth aspect of the invention comprises a seal lip being integrally fitted to an annular case fixed on an inner peripheral face of a housing and being opened in a tapered shape to the sealed liquid side; a slinger being tight fitted to an outer periphery of a rotary shaft inserted in the inner periphery of the housing and being slidably contacted with the seal lip at a flange part; and a dust cover being tight fitted on the outer periphery of the rotary shaft so as to be positioned at the atmosphere side of the slinger and having a dust lip slidably contacted with the flange part of the case at an outer periphery side of the dust cover, and is structured such that the dust cover comprises a vent passage for releasing pressure in a seal internal space between sliding parts of the seal lip and the dust lip to the atmosphere side, and a dust filter provided in the vent passage. Therefore, even when the air is discharged by centrifugal force applied to the sliding part from seal internal space between a sliding part of the seal lip and the slinger and between a sliding part of the dust lip and the case, pressure in the seal internal space is released through the vent passage, so that the pressure does not become negative.

The lip type end face sealing device according to a sixth aspect of the invention has, in addition to the constitution of any of the first to fifth aspects, a constitution that spiral grooves for pumping to the outer peripheral side by the rotation of the slinger are formed on a slidably contacting face of the seal lips and the slingers.

The lip type end face sealing device according to a seventh aspect of the invention has, in addition to the constitution of the fifth aspect, a constitution that the vent passage is formed in a slit shape at the portion passing through a rubber layer. That is, the slit shaped portion passing through the rubber layer is ordinarily closed and operates so as to be opened when the negative pressure is generated in the seal internal space. Thus, the dust filter positioned at the inner side of the vent passage is not constantly exposed to external dusts, and invading of dusts having large particles is also prevented.

The lip type end face sealing device according to an eighth aspect of the invention has, in addition to the constitution of the fifth aspect, a constitution that the vent passage spirally extends along a fitting part with the rotary shaft in an inner peripheral part of the dust cover. Thereby, a filtration route by the dust filter in the vent passage can be lengthened.

The lip type end face sealing device according to a ninth aspect of the invention has, in addition to the constitution of the fifth aspect, a constitution that positioning of an inner peripheral part of the dust cover is decided by contacting to an end face at the atmosphere side of the slinger. By this constitution, in the process of mounting the seal, the inner peripheral part of the dust cover is contacted with the end face at the atmosphere side of the slinger so that positioning of the dust cover to the slinger can be decided.

A lip type end face sealing device according to a tenth aspect of the invention comprises a seal lip being integrally fitted to an annular case fixed on an inner peripheral face of a housing and being opened in a tapered shape to the sealed liquid side; a slinger being tight fitted to an outer periphery of a rotary shaft inserted in the inner periphery of the housing and being slidably contacted with the seal lip at a flange part; and a dust cover being tight fitted on the outer periphery of the rotary shaft so as to be positioned at the atmosphere side of the slinger and having a dust lip slidably contacted with the case at an outer periphery side of the dust cover, and is structured such that the dust lip is separated from the case by centrifugal force at the predetermined rotating speed or more so as to release the pressure in the internal space of the dust cover to an external.

A lip type end face sealing device according to an eleventh aspect of the invention comprises a seal lip being integrally fitted to an annular case fixed on an inner peripheral face of a housing and being opened in a tapered shape to the sealed liquid side; a slinger being tight fitted to an outer periphery of a rotary shaft inserted in the inner periphery of the housing, and being slidably contacted with the seal lip at a flange part; and a dust cover being tight fitted on the outer periphery of the rotary shaft so as to be positioned at the atmosphere side of the slinger and having a dust lip slidably contacted with the case at an outer periphery side of the dust cover, and is structured such that at least one of the sliding faces of the dust lip and the case which are slidably contacted each other is processed with a surface roughening treatment. Thereby, countless slight labyrinth-shaped vent passages are formed between the dust lip and the case.

In the lip type end face sealing device according to the first to fourth aspects of the inventions, since the seal lips are tight contacted with the flange parts of the slingers, a load according to sliding is low. Further, since the pressure in the seal internal space between the sliding parts of the both seal lips and the both slingers is released through the vent passage, causing of the negative pressure in the space by the rotation of the slingers can be prevented. Therefore, entirely contacting of the seal lips to the slingers by the negative pressure can be prevented, so that excellent sealability can be kept for a long period of time.

Further, in the lip type end face sealing device according to the fourth aspect of the invention, in addition to the effect of the first aspect, dusts in the atmosphere do not invade into the sealed liquid and a sealing structure can be simplified.

In the lip type end face sealing device according to the fifth to ninth aspect of the invention, since the pressure in the seal internal space is released through the vent passage, entirely contacting of the seal lip and the dust lip by the negative pressure can be prevented, so that excellent sealability can be kept for a long period of time. Further, since the air hole does not need to be formed at the housing side, the seal structure can be simplified. Furthermore, since air sucked into the seal internal space can be filtrated by the dust filter, dusts in the atmosphere do not invade into the sealed liquid.

In the lip type end face sealing device according to the sixth aspect of the invention, the spiral groove can remove the sealed liquid, which may invade from the outer peripheral side to the sliding parts of the seal lip and the slinger, by the pumping work generated by the rotation of the slinger. Therefore, sealability can be remarkably increased.

In the lip type end face sealing device according to the seventh aspect of the invention, the dust filter is not constantly exposed to external dusts and invading of dusts having large particles can be prevented. Thus, in addition to the effect of the fifth aspect, a dust removing function can be enhanced more and the dust filter is hardly clogged.

In the lip type end face sealing device according to the eighth aspect of the invention, in addition to the effect the fifth aspect, since the filtration route by the dust filter is lengthened, the dust removing function can be enhanced more.

In the lip type end face sealing device according to the ninth aspect of the invention, in addition to the effect of the fifth aspect, positioning of the dust cover to the slinger can be easily decided when mounting the seal.

In the lip type end face sealing device according to the tenth aspect of the invention, the dust lip is opened by the centrifugal force at the time of the rotation so as to release the pressure in the seal internal space. Thus, entirely contacting of the seal lip and the dust lip by the negative pressure can be prevented, so that excellent sealability can be kept for a long period of time. Further, since the air hole does not need to be formed, the seal structure can be simplified. Furthermore, since air sucked into the seal internal space is filtrated by the dust filter, dusts in the atmosphere do not invade into the sealed liquid.

In the lip type end face sealing device according to the eleventh aspect of the invention, the pressure in the seal internal space is released through the labyrinth space formed by processing the sliding part of the dust lip with the surface roughening treatment. Thus, entirely contacting of the seal lip and the dust lip by the negative pressure can be prevented, so that excellent sealability can be kept for a long period of time. Further, since the air hole does not need to be formed, the seal structure can be simplified. Furthermore, since air sucked into the seal internal space can be filtrated by the labyrinth space and the dust filter, dusts in the atmosphere do not invade into the liquid to be sealed.

Figure 1:
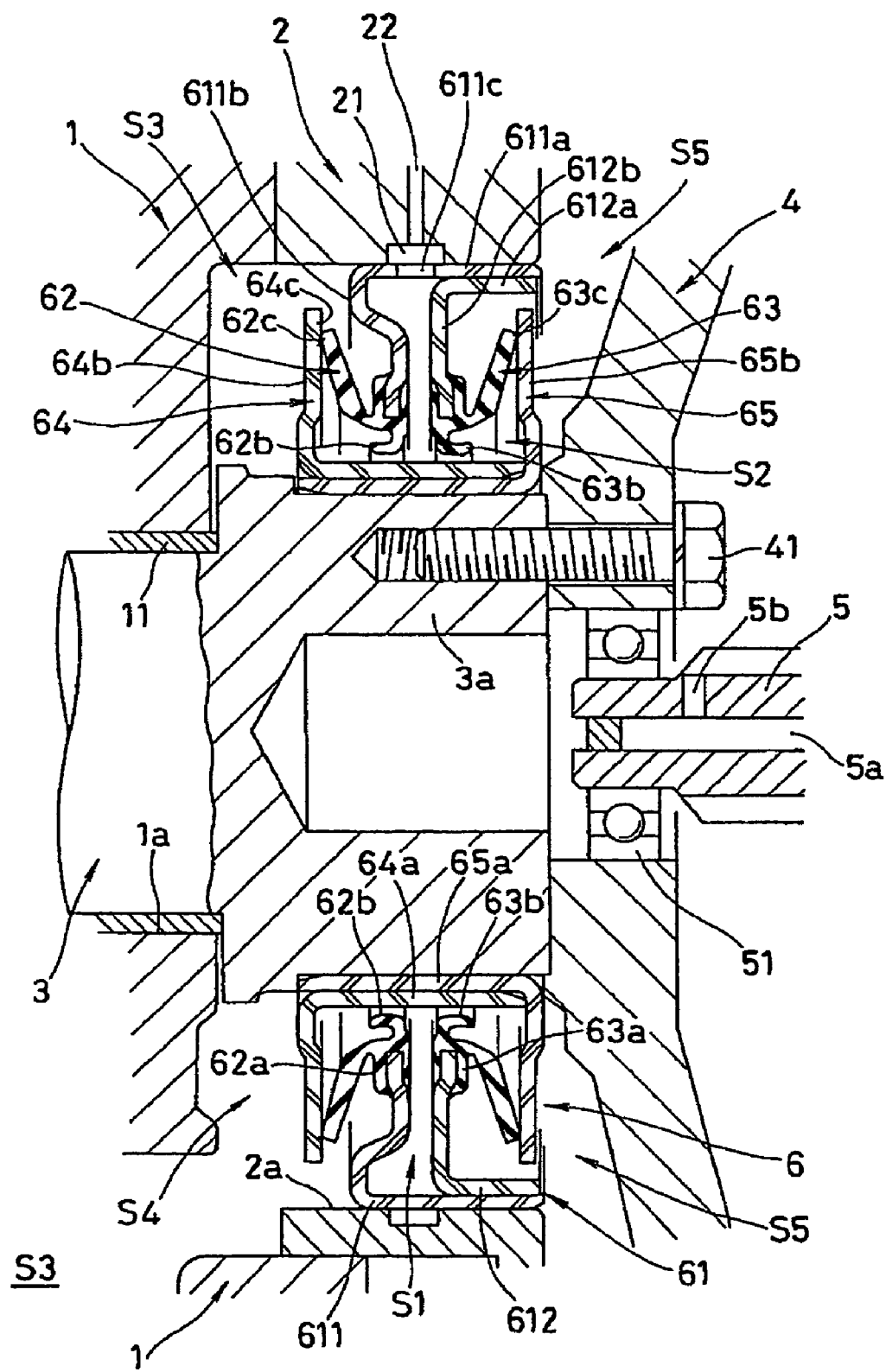
FIG. 1 is a half cross sectional view illustrating the mounted state of a lip type end face sealing device according to a first embodiment of the present invention by cutting a plane passing a shaft axis.

EXPLANATION OF NUMERAL 2 housing
2a inner peripheral face
21 annular groove (vent passage)
22 vent hole (vent passage)
3 crank shaft (rotary shaft)
6 lip type end face sealing device
6A first end face seal
6B second end face seal
6C end face seal
6D dust cover
61, 61A, 61B case
61c outer peripheral flange part
61e end face
611, 612 case member
611c, 65e, 70d air hole (vent passage)
62, 63 seal lip
62a, 63a, 66 basic part
62b, 63b tongue piece part
62c, 63c end edge
64, 65 slinger
64a, 65a fitting cylindrical part
64b, 65b flange part
64c spiral groove
62d, 66a gasket part
67 vent tube (vent passage)
68, 68A, 68B dust filter
69 annular holder
70 dust lip
70b top end face
70c inner peripheral basic part (inner peripheral part)
$70d_1$ internal air hole
$70d_2$ external air hole
70e rubber layer
70f fitting groove
71 reinforcement ring
72 spiral groove
S1, S6, S7 vent space (vent passage)
S2, S8 seal internal space

DETAILED DESCRIPTION OF PREFERRED EMBODIMENT

Figure 2:
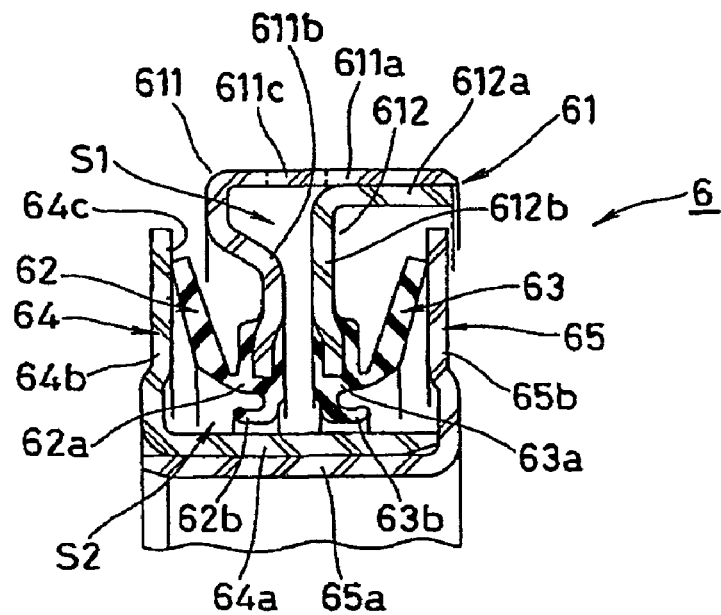
FIG. 2 is a half cross sectional view illustrating the not mounted state of a lip type end face sealing device according to a first embodiment of the present invention by cutting a plane passing a shaft axis.

FIG. 1 is a half cross sectional view illustrating the mounted state of a lip type end face sealing device according to a first embodiment of the present invention by cutting a plane passing a shaft axis, where the lip type end face sealing device is properly applied as a sealing means between engine oil and clutch oil in a wet type engine of a construction machine or the like. FIG. 2 is a half cross sectional view illustrating the not mounted state of the lip type end face sealing device by cutting a plane passing a shaft axis.

In FIG. 1, a reference code 1 is a crank case of the wet type engine. A reference code 2 is a housing attached to an outer periphery of an opening part of a shaft hole 1a in the crank case 1. A reference code 3 is a crank shaft which is inserted into the shaft hole 1a of the crank case 1 in the approximately horizontal direction and rotatably and axially supported by a bearing 11. A reference code 4 is a flywheel attached to a rear end part 3a of the crank shaft 3 by a bolt 41. A reference code 5 is a transmission shaft having one end rotatably supported by an inner periphery of the flywheel 4 through a bearing 51. The crank shaft 3 corresponds to a rotary shaft described in the first aspect. A lip type end face sealing device 6 according to a first embodiment of the present invention is mounted between an inner peripheral face of the housing 2 and an outer peripheral face of the rear end part 3a of the crank shaft 3 which is projected from the shaft hole 1a of the crank case 1.

The lip type end face sealing device 6 includes an annular case 61 tight fitted to an inner peripheral face 2a of the housing 2; a pair of seal lips (first and second seal lips) 62 and 63, which are integrally fitted to an inner periphery of the case 61; and a pair of slingers (first and second slingers) 64 and 65, which are attached to an outer peripheral face of the rear end part 3a of the crank shaft 3.

As illustrated in FIGS. 1 and 2, the case 61 includes a pair of case members (first and second case members) 611 and 612, which are formed by punching and pressing a metal plate such as a steel plate or the like. More particularly, the first case member 611 includes a fitting cylindrical part 611a which is pressed-in and tight fitted to the inner peripheral face 2a of the housing 2 having a predetermined interference; and an inner peripheral flange part 611b which extends from one end of the fitting cylindrical part 611a to the inner peripheral side. Further, the second case member 612 includes a fitting cylindrical part 612a which is pressed-in and fitted in a tight contacting state to an inner peripheral face of the cylindrical part 611a in the first case member 611; and an inner peripheral flange part 612b which extends from one end of the fitting cylindrical part 612a to the inner peripheral side. A vent space S1 extending in the diameter direction is formed between the inner peripheral flange parts 611b and 612b. Further, an air hole 611c facing the vent space S1 is provided and opened at the inside of a fitting part where the fitting cylindrical part 611a of the first case member 611 is fitted with the fitting cylindrical part 612a of the second case member 612.

The first and second seal lips 62 and 63 are made of a rubber like elastic material. Basic parts 62a and 63a of these seal lips 62 and 63 are integrally vulcanization-bonded to the inner peripheral flange parts 611b and 612b of the first and second case members 611 and 612 in the case 61, so as to cover inner peripheral parts of the inner peripheral flange parts 611b and 612b. The first and second seal lips 62 and 63 are formed from the basic parts 62a and 63a toward the outer peripheral side and are positioned oppositely to each other in the axial direction so as to be opened in a tapered shape. Further, tongue piece parts 62b and 63b are formed on the inner peripheries of the basic parts 62a and 63a, and are positioned oppositely to each other in the axial direction.

The first and second slingers 64 and 65 are formed by punching and pressing a metal plate such as a steel plate or the like. The slingers 64 and 65 respectively have fitting cylindrical parts 64a and 65a on inner peripheries thereof, and the fitting cylindrical parts 64a and 65a are pressed-in and fitted each other in a tight contacting state, so as to be integrated. Further, the fitting cylindrical part 65a of the slinger 65 at the relatively inner peripheral side is pressed-in and fitted to an outer peripheral face of a rear end part 3a of the crank shaft 3 in a tight contacting state with the predetermined interference.

The first slinger 64 has a flange part 64b positioned at the axial directionally inner side (the crank case 1 side) of the inner peripheral flange part 611b of the first case member 611 in the case 61. The second slinger 65 has a flange part 65b positioned at the axial directionally outer side (the flywheel 4 side) of the inner peripheral flange part 612b of the second case member 612 in the case 61. Further, the first and second seal lips 62 and 63 have end edges 62c and 63c which are positioned oppositely to each other. The end edges 62c and 63c is tight contacted with end faces of the flange parts 64b and 65b which are approximately vertical with respect to the shaft axis, while slightly bending and deforming toward the inner flange parts 611b and 612b sides of the first and second case members 611 and 612.

A sliding face of the flange part 64b of the first slinger 64 to the first seal lip 62 has a plurality of spiral grooves (for example, four spiral grooves) 64c for having a pumping work to push out a liquid toward the outer peripheral side by rotation. Further, a sliding face of the flange part 65b of the second slinger 65 to the second seal lip 63 is formed to be a flat face. However, spiral grooves which are as symmetrical as the spiral grooves 64c of the flange part 64b may be formed on the sliding face of the flange part 65b, so as to have the pumping work to push out a liquid toward the outer peripheral side at the time of the rotation.

The first seal lip 62 is integrally vulcanization-formed with the first case 611 by the steps of setting the first case member 611 into a predetermined metal mold (not illustrated in the drawings) in which a vulcanization adhesive is coated on the inner peripheral flange part 611b in advance; filling a unvulcanization rubber material for molding into an annular cavity which is defined so as to extend from the surrounding of the inner peripheral flange part 611b after closing the metal mold; and heating and pressurizing it. The second seal lip 63 is also integrally formed with the second case member by the same steps as the first seal lip 62. Then, the fitting cylindrical part 612a of the second case member 612 is pressed-in and fitted to the fitting cylindrical part 611a of the first case member 611, so as to assemble the case 61 having integrally the first and second seal lips 62 and 63. Further, the first and second slingers 64 and 65 are integrated by pressing-in and fitting the fitting cylindrical parts 64a and 65a from the axial directionally both sides of the case 61. Thereby, these parts are made into a unit as illustrated in FIG. 2.

The inner peripheral face 2a of the housing 2 illustrated in FIG. 1 has an annular groove 21 at the axial directional position, which corresponds to that of the vent hole 611c when the case 61 of the lip type end face sealing device 6 is pressed-in, positioned, and fixed. A vent hole 22 is opened at a part in the circumferential direction of the annular groove 21.

The vent space S1, the air hole 611c, the vent groove 21 and the vent hole 22 are for constituting the vent passage described in the first aspect. That is, in the mounted state in FIG. 1, the seal internal spaces S2 formed between the sliding parts of the first and second seal lips 62 and 63 and the first and second slingers 64 and 65 are opened to the atmosphere through the vent space S1, the vent hole 611c, the vent groove 21, and the vent hole 22, which are formed between the first case member 611 and the second case member 612 in the case 61.

In the above-described constitution, a lower part of a crank chamber S3 in the crank case 1 has the bearing 11 and stores a proper amount of engine oil (not illustrated in the drawings) for lubricating a piston or the like inside the engine. On the other hand, an internal chamber (the right side in FIG. 1) of the housing 2 stores clutch oil (not illustrated in the drawings) supplied to a clutch plate from an injection open 5b through an inner peripheral hole 5a of a transmission shaft 5. Further, the lip type end face sealing device 6 is for sealing to prevent that the engine oil scattered in the crank chamber S3 and the clutch oil scattered in the housing 2 are mixed each other through a shaft periphery of the rear end part 3a of the crank shaft 3.

More particularly, when the crank shaft 3 is rotated, the flange parts 64b and 65b of the first and second slingers 64 and 65 rotated together with the crank shaft 3 are tight contacted and slid with the end edges 62c and 63c of the first and second seal lips 62 and 63, which are fixed on the housing 2 side through the case (the first and second case members 611 and 612) and are not rotated. Further, when the engine oil reaching to a space S4 between the lip type end face sealing device 6 and the crank case 1 is going to pass the sliding part of the flange part 64b of the first slinger 64 and the first seal lip 62 toward the inner peripheral side, the engine oil is discharged toward the outer peripheral side by centrifugal force generated by the rotation of the flange part 64b. Similarly, when the scattered clutch oil reaching to a space S5 between the lip type end face sealing device 6 and the flywheel 4 is going to pass the sliding part of the flange part 65b of the second slinger 65 and the second seal lip 63 toward the inner peripheral side, the clutch oil is discharged toward the outer peripheral side by centrifugal force generated by rotation of the flange part 65b.

At this time, an oil amount of the engine oil reaching to the space S4 from the crank chamber S3 is much more than an oil amount of the clutch oil scattered toward the space S5. However, at the sliding part of the flange part 64b of the first linger 64 and the first seal lip 62, the spiral groove 64c formed on the flange part 64b have the pumping work to remove the liquid toward the outer peripheral side. Thus, excellent sealability can be exercised according to the centrifugal force by rotation of the flange part 64b.

Further, air in the seal internal space S2 in the lip type end face sealing device 6 is discharged from the sliding parts, by the centrifugal force and the pumping work generated at the spiral groove 64c in the sliding part of the flange part 64b of the first slinger 64 and the first seal lip 62, and by the centrifugal force generated in the sliding part of the flange part 65b of the second slinger 65 and the second seal lip 63. However, the seal internal space S2 is opened to the atmosphere through the vent space S1, the vent hole 611c, the vent groove 21 and the vent hole 22, which are formed between the first case member 611 and the second case member 612 in the case 61. So, the pressure in the space S2 does not become negative. Therefore, entirely contacting of the first and second seal lips 62 and 63 to the flange parts 64b and 65b of the first and second slingers 64 and 65 by the negative pressure can be prevented. Further, the first and second seal lips 62 and 63 are different from the radial seal lip in FIG. 5 described above, and are tight contacted with the first and second slingers 64 and 65 by bending reaction force in the axial direction. So, the face pressures of the first and second seal lips 62 and 63 are low. Therefore, increasing of sliding load and early abrasions of the first and second seal lips 62 and 63 caused from increasing of sliding load can be effectively prevented.

In addition, in the sliding parts of the flange parts 64b and 65b of the first and second slingers 64 and 65 and the first and second seal lips 62 and 63, if a slight amount of the engine oil or the clutch oil is invaded from upper half parts toward the inner peripheral side, the leaking liquid is pushed and returned toward the outer peripheral side by the centrifugal force and the pumping work at the flange parts 64b and 65b sides. However, at the upper half parts sides of the first and second seal lips 62 and 63, the leaking liquid flows downward along the tapered surfaces of these lips, and the tongue piece parts 62b and 63b receives the leaking liquid. Further, the leaking liquid flows toward a lower half part along the circumferential groove between the tongue piece parts 62b and 63b and the first and second seal lips 62 and 63, and flows and falls downward, that is, to the outer peripheral side, along the tapered surfaces of the lower half parts of the first and second seal lips 62 and 63. Thus, the leaking liquid is pushed and returned to the outer peripheral side from the sliding parts of the flange parts 64b and 65b by the centrifugal force and the pumping work.

Figure 3:
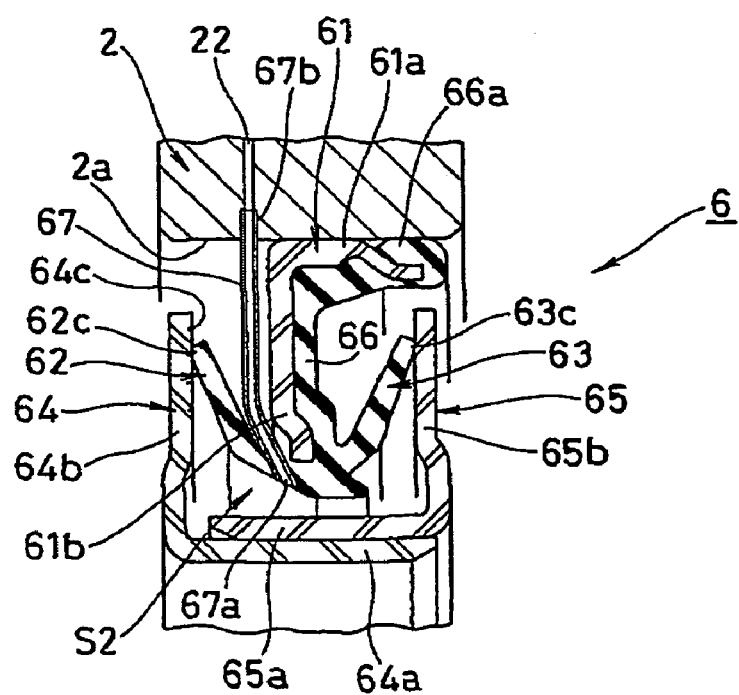
FIG. 3 is a half cross sectional view illustrating a lip type end face sealing device according to a second embodiment of the present invention by cutting a plane passing a shaft axis.

FIG. 3 is a half cross sectional view illustrating the state that a lip type end face sealing device according to a second embodiment of the present invention is mounted, by cutting a plane passing a shaft axis. This lip type end face sealing device is properly applied as a sealing means between engine oil and clutch oil in a wet type engine of a construction machine or the like. That is, the lip type end face sealing device 6 includes an annular case 61 tight fitted to an inner peripheral face 2a of a housing 2, a pair of seal lips (first and second seal lips) 62 and 63 integrally provided at an inner periphery of the case 61, and a pair of slingers (first and second slingers) 64 and 65 attached to a rear end part outer peripheral face of a c-rank shaft not illustrated in the drawings.

The case 61 is formed by punching and pressing a metal plate such a steel plate or the like. The case 61 includes a fitting cylindrical part 61a pressed into the inner peripheral face 2a of the housing 2 with a predetermined interference and an inner peripheral flange part 61b extending from one end of the fitting cylindrical part 61a toward the inner peripheral side.

The first and second seal lips 62 and 63 are made of a rubber like elastic material. The first and second seal lips 62 and 63 are connected each other through a basic part 66 which is shared by the lips 62 and 63. The first and second seal lips 62 and 63 are positioned oppositely to each other in the axial direction and opened in a tapered shape. Further, the basic part 66 is integrally vulcanization-bonded to the case 61. An outer peripheral part of the basic part 66 surrounds the outer peripheral side of the fitting cylindrical part 61a of the case 61 so as to constitute a gasket part 66a tight contacted with the inner peripheral face 2a of the housing 2 with a predetermined margin.

The first and second slingers 64 and 65 are similar to the slingers in the embodiments in FIGS. 1 and 2 described above. A sliding face of a flange part 64b of the first slinger 64 to the first seal lip 62 has a plurality of spiral grooves (for example, four spiral grooves) 64c having a pumping work to push out liquid toward the outer peripheral side by rotation. Further, also in this embodiment, although a sliding face of the flange part 65b of the second slinger 65 to the second seal lip 63 is a flat face, spiral grooves which are symmetrical with the spiral grooves 64c of the flange part 64b may be formed.

Further, the first and second seal lips 62 and 63 have end edges 62c and 63c which are positioned oppositely to each other. The end edges 62c and 63c are tight contacted with flange parts 64b and 65b of the first and second slingers 64 and 65, which are vertical with respect to the shaft axis. These end edges are slightly bent and deformed to the inner flange parts 611b and 612b sides of the first and second case members 611 and 612.

A vent tube 67 is inserted into an inner peripheral part of the basic part 66 of the first and second seal lips 62 and 63. An outer peripheral face of the vent tube 67 and the basic part 66 are tight contacted each other. One end 67a of the vent tube 67 is opened on an inner periphery of the basic part 66, and another end 67b can be tight connected to the vent hole 22 opened on the inner peripheral face 2a of the housing 2. That is, in the mounting state of the lip type end face sealing device 6, the seal internal spaces S2 between the sliding parts of the first and second seal lips 62 and 63 and the flange parts 64b and 65b of the first and second slingers 64 and 65 are opened to the atmosphere through the vent tube 67 and the vent hole 22.

In the lip type end face sealing device 6 according to the second embodiment having the above-described structure, similarly to the first embodiment, the case 61 is attached to the inner peripheral face 2a of the housing 2, and the first and second slingers 64 and 65 are attached to the outer peripheral face of the rear end part 3a of the crank shaft 3. Then, to prevent the engine oil scattered in the crank chamber S3 shown in FIG. 1 and the clutch oil scattered in the housing 2 from being mixed each other through a shaft periphery of the rear end part 3a of the crank shaft 3, sealing is carried out by the sliding parts of the first and second seal lips 62 and 63 and the flange parts 64b and 65b of the first and second slingers 64 and 65.

Further, also in this case, the engine oil reaching to the sliding parts of the first seal lip 62 and the flange part 64b of the first slinger 64 is discharged toward the outer peripheral side by the centrifugal force by the rotation of the flange part 64b and the pumping work of the spiral groove 64c. Further, the scattered clutch oil reaching to the sliding parts of the second seal lip 63 and the flange part 65b of the second slinger 65 is discharged by the centrifugal force by the rotation of the flange part 65b.

Further, the seal internal spaces S2 between the sliding parts of the first and second seal lips 62 and 63 and the flange parts 64b and 65b of the first and second slingers 64 and 65 are opened to the atmosphere through the vent tube 67 and the vent hole 22. Thus, the pressure in the spaces S2 does not become negative by the centrifugal force and the pumping work occurring at the sliding parts of the flange part 64b of the first slinger 64 and the first seal lip 62, and by the centrifugal force occurring at the sliding parts of the flange part 65b of the second slinger 65 and the second seal lip 63. Therefore, entirely contacting of the first and second seal lips 62 and 63 to the flange parts 64b and 65b of the first and second slingers 64 and 65 by the negative pressure can be prevented. Further, the first and second seal lips 62 and 63 are tight contacted with the flange parts 64b and 65b by bending reaction force in the axial direction, so that the face pressures of the seal lips 62 and 63 are low. Thus, increasing of sliding load and early abrasions of the first and second seal lips 62 and 63 caused from increasing of the sliding load can be effectively prevented.

Figure 4:
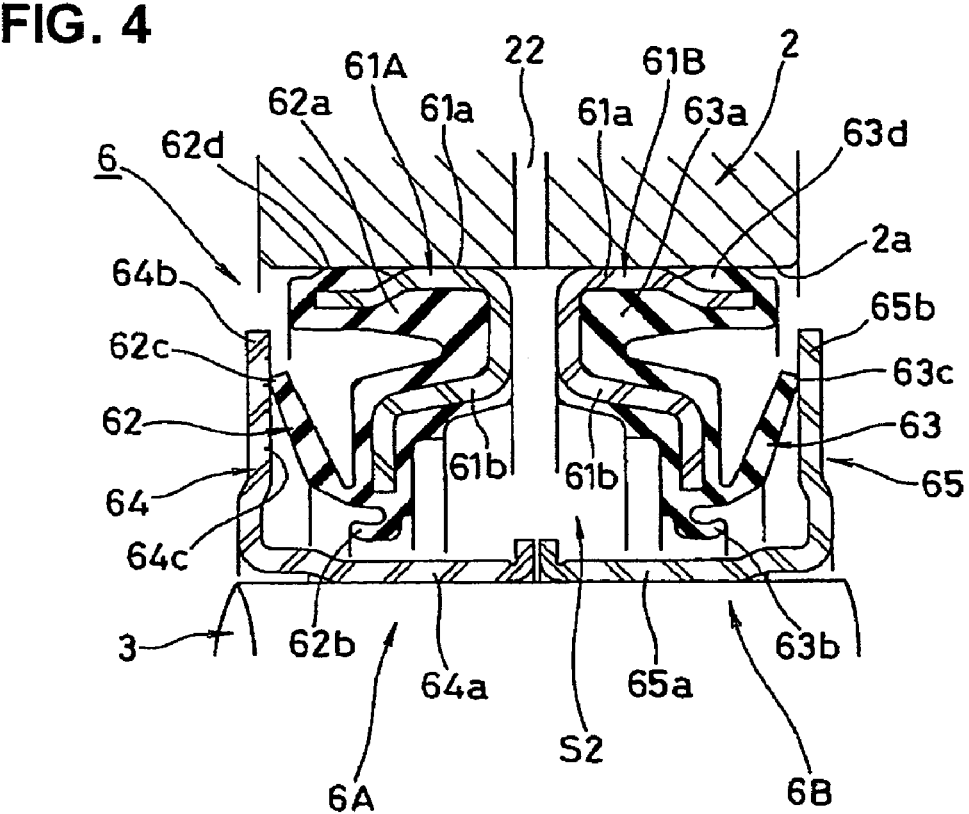
FIG. 4 is a half cross sectional view illustrating a lip type end face sealing device according to a third embodiment of the present invention by cutting a plane passing a shaft axis.

In both of the first embodiment illustrated in FIGS. 1 and 2 and the second embodiment illustrated in FIG. 3, the first and second seal lips 62 and 63 are integrated, and the first and second stingers 64 and 65 are integrally fitted. However, the first sealing lip 62 and the first slinger 64 for sealing the engine oil, and the second seal lip 63 and the second slinger 65 for sealing the clutch oil, may be structured as separate members each other. FIG. 4 is a half cross sectional view illustrating a lip type end face sealing device according to a third embodiment of the present invention having such the structure, by cutting a plane passing a shaft center.

That is, the lip type end face sealing device 6 comprises a pair of end face seals 6A and 6B. The first end face seal 6A includes an annular case 61A tight fitted at a crank case side (the left side in FIG. 4) on an inner peripheral face 2a of a housing 2, a seal lip 62 integrally provided with the case 61A, and a first slinger 64 attached at the crank case side (the left side in FIG. 4) on a rear end outer peripheral face of a crank shaft 3. Similarly, the second end face seal 6B includes, an annular case 61B tight fitted at a flywheel side (the right side in FIG. 4) on the inner peripheral face 2a of the housing 2, a seal lip 63 integrally provided with the case 61B, and a second slinger 65 attached at the flywheel side (the right side in FIG. 4) on the rear end part outer peripheral face of the crank shaft 3.

The cases 61A and 61B are formed by punching and pressing a metal plate such a steel plate or the like. The cases 61A and 61B include a fitting cylindrical part 61a pressed-in and tight fitted to the inner peripheral face 2a of the housing 2 with a predetermined interference and an inner peripheral flange part 61b extending from one end of the fitting cylindrical part 61a toward the inner peripheral side. The inner peripheral flange parts 61b are positioned oppositely and separately to each other.

The first seal lip 62 in the first end face seal 6A is made of a rubber like elastic material. The first seal lip 62 is opened in a tapered shape toward the crank case side (the left side in FIG. 4). A basic part 62a of the first seal lip 62 is integrally vulcanization-bonded to the case 61A. An outer peripheral part of the basic part 62a surrounds the outer peripheral side of the fitting cylindrical part 61a of the case 61A, so as to constitute a gasket part 62d tight contacted with the inner peripheral face 2a of the housing 2 with a predetermined margin. Further, an inner periphery of the basic part 62a has a tongue piece part 62b directed to the crank case side (the left side in FIG. 4).

The second seal lip 63 in the second end face seal 6B is similar to the first seal lip 62, and is provided symmetrically with the first seal lip 62. That is, the second seal lip 63 is formed so as to be opened in a tapered shape toward the flywheel side (the right side in FIG. 4). A basic part 63a of the second seal lip 63 is integrally vulcanization-bonded to the case 61B. An outer peripheral part of the basic part 63a surrounds the outer peripheral side of the fitting cylindrical part 61a of the case 61B, so as to constitute a gasket part 63d tight contacted with the inner peripheral face 2a of the housing 2 with a predetermined margin. Further, an inner periphery of the basic part 63a has a tongue piece part 63b directed to the flywheel side (the right side in FIG. 4).

The first slinger 64 in the first end face seal 6A is formed by punching and pressing a metal plate such a steel plate or the like, and includes a fitting cylindrical part 64a tight pressed-in and fitted to the rear end part outer peripheral face of the crank shaft 3 with a predetermined interference. An outer peripheral end edge 62c of the first seal lip 62 is tight contacted with the flange part 64b which is approximately vertical to a shaft axis, while being slightly bent and deformed to the inner peripheral flange part 61b side of the case 61A. Further, a sliding face of the flange part 64b of the first slinger 64 to the first seal lip 62 has a plurality of spiral grooves (for example, four spiral grooves) 64c having a pumping work to push out liquid toward the outer peripheral side by rotation.

On the other hand, the second slinger 65 in the second end face seal 6B is similar to the first slinger 64, and is formed by punching and pressing a metal plate such a steel plate or the like. Further, the slinger 65 includes a fitting cylindrical part 65a tight pressed-in and fitted to the rear end part outer peripheral face of the crank shaft 3 with a predetermined interference, and is provided symmetrically with the first slinger 64. An outer peripheral end edge 63c of the second seal lip 63 is tight contacted with the flange part 65b which is approximately vertical to a shaft axis, while slightly bent and deformed to the inner peripheral flange part 61b side of the case 61B. Further, although a sliding face of the flange part 65b of the second slinger 65 with the second seal lip 63 is formed to be a flat, spiral grooves which are symmetrical with the spiral grooves 64c of the first slinger 64 may be formed.

The inner peripheral face 2a of the housing 2 has a vent hole 22 opened and positioned between a mounting position of the case 61A in the first end face seal 6A and a mounting position of the case 61B in the second end face seal 6B. That is, when the first end face seal 6A and the second end face seal 6B are mounted, the seal internal spaces S2 between the sliding parts of the first and second seal lips 62 and 63, and the first and the second slingers 64 and 65 are opened to atmosphere through the vent hole 22.

Therefore, also in the lip type end face sealing device 6 according to the third embodiment, the effects similar to those in the first and second embodiments described above can be obtained. That is, since the seal internal space S2 defined between the first end face seal 6A and the second end face seal 6B is opened to atmosphere through the vent hole 22, the pressure in the space S2 does not become negative, by the centrifugal force and pumping work occurring at the sliding parts of the flange part 64b of the first slinger 64 and the first seal lip 62, and by the centrifugal force occurring at the sliding parts of the flange part 65b of the second slinger 65 and the second seal lip 63. Thus, increasing of sliding load and early abrasions of the first and second seal lips 62 and 63 caused by increasing of sliding load can be effectively prevented. Further, the tongue piece parts 62b and 63b have functions similar to those in the first embodiment described above.

Figure 5:
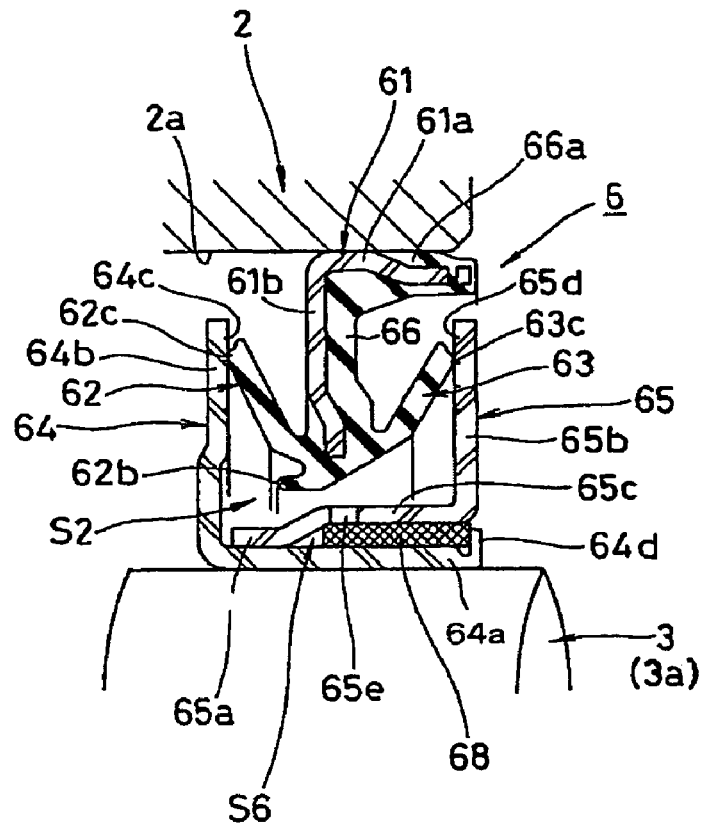
FIG. 5 is a half cross sectional view illustrating a lip type end face sealing device according to a fourth embodiment of the present invention by cutting a plane passing a shaft axis.

FIG. 5 is a half cross sectional view illustrating a lip type end face sealing device according to a fourth embodiment of the present invention by cutting a plane passing a shaft axis. This lip type end face sealing device is applied as a sealing means between engine oil and atmosphere in an engine having severe external dust conditions, such as an engine of a construction machine or the like. That is, the lip type end face sealing device 6, similarly to that of the second embodiment (FIG. 3) described above, includes an annular case 61 pressed into an inner peripheral face 2a of a housing 2 at a fitting cylindrical part 61a, a pair of seal lips (first and second seal lips) 62 and 63 integrally provided at an inner periphery of the case 61, and a pair of slingers (first and second slingers) 64 and 65 attached to a rear end part outer peripheral face of a crank shaft 3. The first seal lip 62 is for sealing engine oil at the left side in FIG. 5 and the second seal lip 63 is for sealing dusts in the atmosphere at the left side in FIG. 5

Difference from the second embodiment is described concretely as follows. The first slinger 64 is tight pressed-in and fitted to an outer peripheral face of a rear end part 3a of the crank shaft 3 with a predetermined interference at a fitting cylindrical part 64a. The first slinger is tight contacted with an end edge 62c of the first seal lip 62 at a flange part 64b which is approximate vertical to a shaft axis. On the other hand, the second slinger 65 has a holding cylindrical part 65c extending from a fitting cylindrical part 65a toward the axial directional external side (the left side in FIG. 5). The fitting cylindrical part 65a is pressed-in and fitted to an outer peripheral face of a fitting cylindrical part 64a of the first slinger 64, at the crank case side (the right side in FIG. 5) with a predetermined interference. The flange part 65b which is approximately vertical to a shaft axis is extended from an end part of the holding cylindrical part 65c.

The first and second slingers 64 and 65 respectively have a plurality of spiral grooves (for example, four grooves) 64c and 65d, and the spiral grooves 64c and 65d have a pumping function to push out liquid at the outer peripheral side by rotation, and are symmetrically formed each other. Further, a grease (not illustrated in the drawings) for lubricating is filled to the sliding parts of the flange part 65b of the second slinger 65 at atmosphere side and the second seal lip 63.

An inner peripheral face of the holding cylindrical part 65c in the second slinger 65 has a larger diameter than that of an outer peripheral face of the fitting cylindrical part 64a of the first slinger 64. That is, a vent space S6 is formed between the holding cylindrical part 65c of the second slinger 65 and fitting cylindrical part 64a of the first slinger 64. Further an air hole 65e is opened at a position at the fitting cylindrical part 65a side of the holding cylindrical part 65c. The air hole 65e and the vent space S6 constitute a vent passage, through which the seal internal spaces S2 formed between the sliding parts of the first and second seal lips 62 and 63 and the first and second slingers 64 and 65 is opened to the atmosphere side (the right side in FIG. 5).

The vent space S6 is filled with a dust filter 68, and is caulked part 64d formed at an end of the fitting cylindrical part 64a of the first slinger 64. The dust filter 68 is made of a fiber aggregate such as a synthetic fabric and cotton, and has permeability due to fine spaces among fibers.

In the lip type end face sealing device 6 according to the fourth embodiment having the constitution mentioned above, the case 61 is attached to the inner peripheral face 2a of the housing 2, and the first and second slingers 64 and 65 are attached to the outer peripheral face of the rear end part 3a of the crank shaft 3. Thereby, leakage of engine oil in the crank chamber of the engine from the sliding parts of the first seal lip 62 and the flange part 64b of the first slinger 64 can be prevented. Further, invasion of dusts in the atmosphere into the crank chamber of the engine from the sliding parts of the second seal lip 63 and the flange part 65b of the second slinger 65 can be prevented. Furthermore, a part between the inner peripheral face 2a of the housing 2 and the fitting cylindrical part 61a of the case 61 is sealed by the gasket part 66a extending from the basic part 66, which is shared by the first and second seal lips 62 and 63.

Further, as for the sliding parts of the flange parts 64b and 65b of the first and second slingers 64 and 65 and the first and second seal lips 62 and 63, the spiral grooves 64c and 64d formed at the flange parts 64b and 65b have the pumping work to discharge liquid toward the outer peripheral side by rotation. Thus, excellent sealability can be exercised according to the centrifugal force by rotations of the flange parts 64b and 65b. In addition, the tongue piece part 62b has functions similar to that of the first embodiment described above.

Further, the air in the seal internal spaces S2 in the lip type end face sealing device 6 is discharged to the outer peripheral side from the sliding parts of the flange parts 64b and 65b and the first and second seal lips 62 and 63, by the pumping work and the centrifugal force. Thus, air outside the device is sucked into the seal internal spaces S2 through the dust filter 68 and the air hole 65e in the vent space S6. Therefore, entirely contacting of the first and second seal lips 62 and 63 to the flange parts 64b and 65b of the first and second slingers 64 and 65 by negative pressure can be prevented. Further, since the first and second seal lips 62 and 63 are tight contacted with the first and second slingers 64 and 65 by bending reaction force in the axial direction, the face pressures of the seal lips 62 and 63 are low. Thus, increasing of sliding load and early abrasions of the first and second seal lips 62 and 63 caused thereby can be effectively prevented.

Further, the dusts contained in atmosphere outside the device, which are sucked into the seal internal spaces S2 through the vent space S6 and the air hole 65e, are separated by the dust filter 68 filled in the vent space S6. Thus, clean air is sucked into the seal internal spaces S2. Therefore, invasion of the dusts into the engine oil in the crank chamber from the sliding parts of the flange part 64b of the first slinger 64 and the first seal lip 62 can be prevented.

Further, according to the above-described constitution, the dust filter 68 is not abraded by sliding, unlike a filter put between a stationary side and a rotation side. Further, there is no generation of a space by eccentricity of the housing 2 and the crank shaft 3. Further, like the embodiment in the drawing, the dust filter 68 is formed in a cylindrical shape, and the air hole 65e is formed at the end part of the dust filter 68. Thus, the filtrating route of air is lengthened, so that excellent removability to dusts can be obtained. Furthermore, according to this embodiment, the vent passage including the vent space S6 and the air hole 65e is formed only in the lip type end face sealing device 6, so that a vent hole does not need to be formed at the housing 2.

Figure 6:
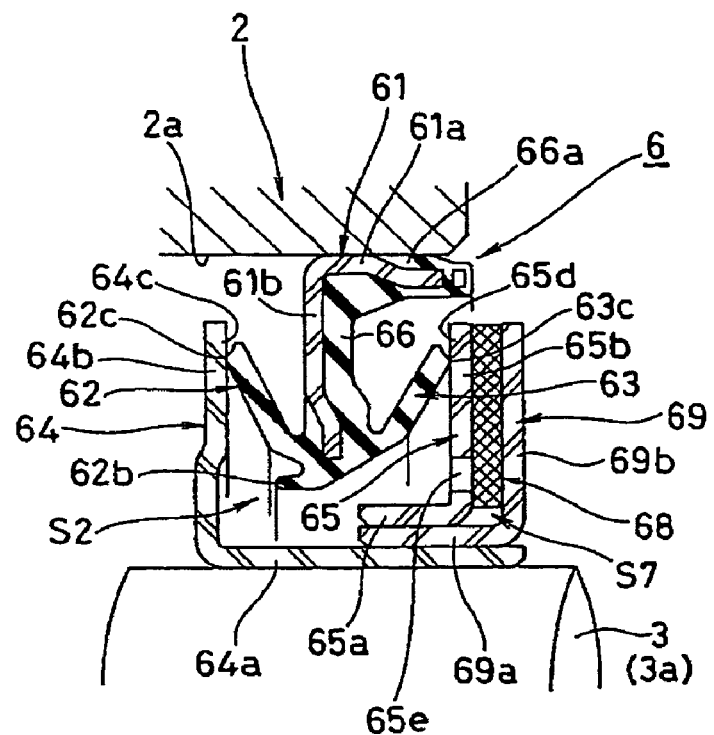
FIG. 6 is a half cross sectional view illustrating an example that a shape of the lip type end face sealing device according to the fourth embodiment is varied, by cutting a plane passing a shaft axis.
Figure 7:
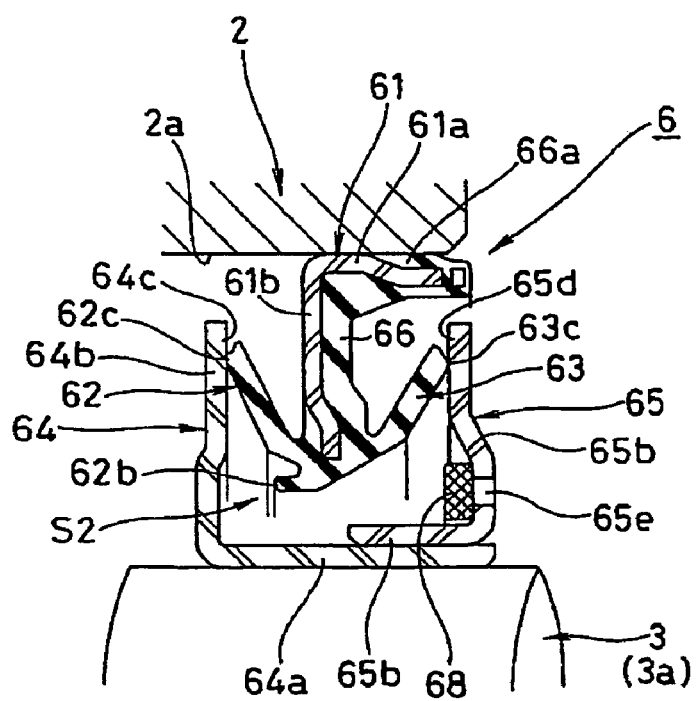
FIG. 7 is a half cross sectional view illustrating an example that a shape of the lip type end face sealing device according to the fourth embodiment is varied, by cutting a plane passing a shaft axis.

FIGS. 6 and 7 are half cross sectional views illustrating an example that a shape of the lip type end face sealing device according to the fourth embodiment illustrated in FIG. 5 is varied, by cutting a plane passing a shaft axis.

The lip type end face sealing device 6 illustrated in FIG. 6 is basically similar to that in FIG. 5. The device 6 includes an annular case 61 pressed into an inner peripheral face 2a of a housing 2, first and second seal lips 62 and 63 integrally provided on an inner periphery of the case 61, and first and second slingers 64 and 65 attached at a crank shaft 3 side. The first seal lip 62 is for sealing engine oil at the left side in FIG. 6, and the second seal lip 63 is for sealing dusts in atmosphere at the right side in FIG. 6.

Difference from the embodiment in FIG. 5 is described concretely as follows. An annular holder 69 is pressed-in and fitted to an outer peripheral face of a fitting cylindrical part 64a of the first slinger 64. A fitting cylindrical part 65a of the second slinger 65 is pressed-in and fitted to an outer peripheral face of a fitting cylindrical part 69a in the annular holder 69. The annular holder 69 is formed by punching and pressing a metal plate such as a steel plate or the like. The annular holder 69 includes a flange part 69b which is approximately vertical to a shaft axis like the second slinger 65. A vent space S7 is formed between the flange part 69b and the flange part 65b of the second slinger 65. Further, an air hole 65e is opened at a position of an inner periphery side in the flange part 65b of the second slinger 65. The air hole 65e and the vent space S7 constitute a vent passage, through which the seal internal spaces S2 between the sliding parts of the first and second seal lips 62 and 63 and the first and second slingers 64 and 65 is opened to the atmosphere side (the right side in FIG. 6).

The vent space S7 is filled with a dust filter 68. The dust filter 68 has an annular shape which is flat in the axial direction, that is, has a disc shape. Further, the dust filter 68 is made of a fiber aggregate such as a synthetic fabric and cotton, and has permeability due to fine spaces among fibers, like that of the embodiment in FIG. 5.

The lip type end face sealing device 6 in FIG. 6 having the above-described structure basically has functions similar to the embodiment in FIG. 5. That is, air in the seal internal spaces S2 is discharged from the sliding part of the flange parts 64b and 65b of the first and second slingers 64 and 65 and the first and second seal lips 62 and 63 at the time of rotating. According to discharging of the air, air outside the device is sucked through the vent space S7 between the flange part 69b of the annular holder 69 and the flange part 65b of the second slinger 65 and the air hole 65e. Thus, generation of the negative pressure in the seal internal spaces S2 can be prevented, and dusts contained in the sucked air outside the device can be removed by the dust filter 68 filled in the vent space S7.

Further, according to this embodiment, the dust filter 68 is formed in the disc shape. So, when the air hole 65e is opened in the flange part 65b of the second slinger 65 so as to be positioned at an inner peripheral part of the dust filter 68, the filtrating route of the air is lengthened, so that excellent removability to the dusts can be obtained. Further, a vent hole or the like is unnecessary to be formed at the housing 2, like the embodiment in FIG. 5. Furthermore, according to this embodiment, the dust filter 68 is held between the flange parts 65b and 69b, so that the dust filter 68 is not moved from the exact position, and is not damaged when assembling.

On the other hand, the lip type end face sealing device 6 illustrated in FIG. 7 basically has a similar structure to the embodiment of FIG. 5. A first seal lip 62 is for sealing engine oil at the left side in FIG. 7, and a second seal lip 63 is for sealing dusts in atmosphere at the right side in FIG. 7.

Difference from the embodiments in FIGS. 5 and 6 is described concretely as follows. A fitting cylindrical part 65a of a second slinger 65 is pressed-in and fitted to an outer peripheral face of a fitting cylindrical part 64a of a first slinger 64. An air hole 65e is opened in an inner peripheral part of a flange part 65b in the second slinger 65. Further, an annular dust filter 68 is added to an inner face of the inner peripheral part of the flange part 65b so as to close the air hole 65e. The dust filter 68 is also made of a fiber aggregate such as a synthetic fabric and cotton, and has permeability due to fine spaces among fibers. The dust filter 68 is fixed by a proper adhesive agent.

The lip type end face sealing device 6 in FIG. 7 having the above-described constitution basically has similar functions to those of the embodiment in FIG. 5. Further, air in the seal internal spaces S2 is discharged from the sliding part of the flange parts 64b and 65b of the first and second slingers 64 and 65 and the first and second seal lips 62 and 63 at the time of rotating by centrifugal force or pumping work of spiral grooves 64c and 65d. According to discharging of the air, air outside the device is sucked through the air hole 65e opened in the flange part 65b of the second slinger 65. Thus, generation of the negative pressure in the seal internal spaces S2 can be prevented, and dusts contained in the sucked air outside the device can be removed by the dust filter 68 provided at the air hole 65e.

Further, according to this embodiment, the vent passage for releasing the pressure in the seal internal spaces S2 toward the atmosphere side is constituted by only the air hole 65e opened in the flange part 65b of the second slinger 65. Further, the dust filter 68 is only adhered to the flange part 65b of the second slinger 65. So, the number of parts can be decreased, and the structure can be simplified.

Figure 8:
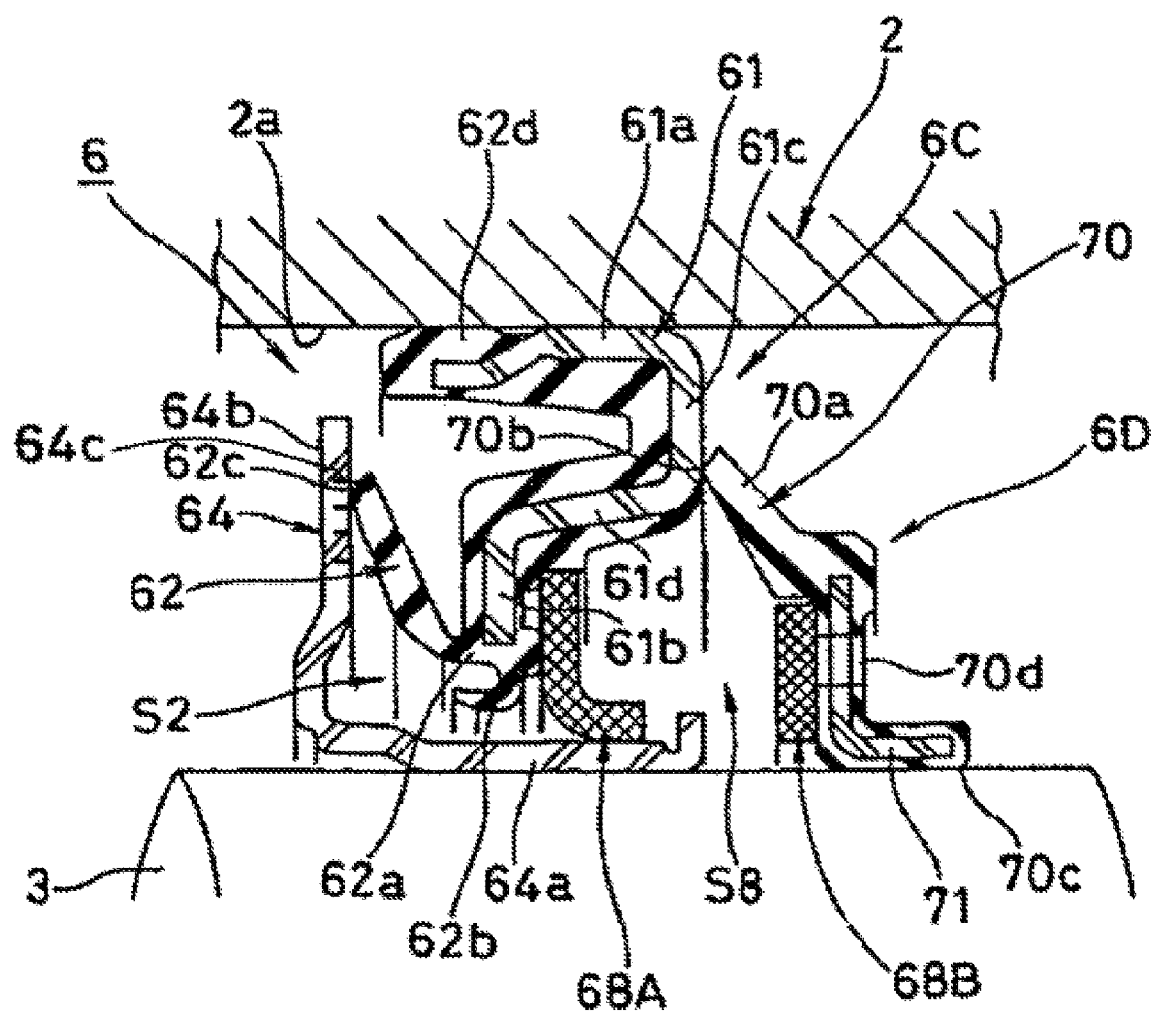
FIG. 8 is a half cross sectional view illustrating a lip type end face sealing device according to a fifth embodiment of the present invention by cutting a plane passing a shaft axis.

FIG. 8 is a half cross sectional view illustrating a lip type end face sealing device according to a fifth embodiment of the present invention, by cutting a plane passing a shaft axis, where the lip type end face sealing device is properly applied as a sealing means between engine oil and atmosphere in an engine having severe external dust conditions.

The lip type end face sealing device 6 comprises an end face seal 6C and a dust cover 6D. The end face seal 6C includes an annular case 61 pressed into an inner peripheral face 2a of a housing 2 at a fitting cylindrical part 61a, a seal lip 62 integrally provided on an inner periphery of the case 61, a slinger 64 attached to an outer peripheral face of a crank shaft 3, and a first dust filter 68A.

The case 61 in the end face seal 6C is formed by punching and pressing a metal plate such as a steel plate or the like. The case 61 includes the fitting cylindrical part 61a pressed-in and tight fitted to the inner peripheral face 2a of the housing 2 with a predetermined interference, an outer peripheral flange part 61c extending from one end of the fitting cylindrical part 61a toward the inner peripheral side, and an inner peripheral flange part 61b extending from an inner periphery of the outer peripheral flange part 61c toward the inner peripheral side through an intermediate part 61d extending toward the crank case side (the left side in FIG. 8).

The seal lip 62 in the end seal 6C is made of a rubber like elastic material, and is opened in a tapered shape toward the crank case side (the left side in FIG. 8). A basic part 62a of the seal lip 62 is integrally vulcanization-bonded to the case 61. An outer peripheral part of the basic part 62a surrounds the outer peripheral side of the fitting cylindrical part 61a of the case 61, so as to constitute a gasket part 62d tight contacted with the inner peripheral face 2a of the housing 2 with a predetermined margin. Further, the inner periphery of the basic part 62a has a tongue piece part 62b directed to the crank case side. Furthermore, the end face of the outer peripheral flange part 61c of the case 61 directed to the atmosphere side is exposed from a rubber layer extending from the basic part 62a of the seal lip 62.

The slinger 64 in the end face seal 6C is formed by punching and pressing a metal plate such as a steel plate or the like. The slinger 64 includes the fitting cylindrical part 64a tight pressed-in and fitted to an outer peripheral face of the crank shaft 3 with a predetermined interference. Further, an outer peripheral end edge 62c of the seal lip 62 is slidably tight contacted with a flange part 64b which is approximate vertical to a shaft axis, while the seal lip 62 is bent and deformed so as to be slightly opened. Further, a sliding face of the flange part 64b of the slinger 64 to the seal lip 62 may have a plurality of spiral grooves having pumping work to push out liquid toward the outer peripheral side by rotation.

The first dust filter 68A is attached to the inner peripheral part of the end face seal 6C while positioning at the atmosphere side of the tongue piece part 62b. The first dust filter 68A is made of a fiber aggregate such as a synthetic fabric and cotton, and has permeability due to fine spaces among fibers. Further, an inner peripheral part of the first dust filter 68A is slidably contacted with the outer peripheral face of the fitting cylindrical part 64a of the slinger 64.

The dust cover 6D comprises a dust lip 70 made of a rubber like elastic material, a reinforcement ring 71 which is formed by punching and pressing a metal plate such as a steel plate or the like and embedded in an inner peripheral basic-part 70c of the dust lip 70, and a second dust filter 68B. As for the dust lip 70, a lip main body part 70a is formed so as to be opened in a tapered shape toward the crank case side (the left side in FIG. 8), and a top end face 70b is slidably tight contacted with an end face of the outer peripheral flange part 61c of the case 61 in the end face seal 6C, while being properly bent and deformed. Further, the inner peripheral basic part 70c is tight fitted to the outer peripheral face of the crank shaft 3 while positioning at the atmosphere side of the slinger 64.

An air hole 70d is opened between the lip main body part 70a and the inner peripheral basic part 70c in the dust cover 6D (the dust lip 70). The air hole 70d is formed at one part or plural parts in the circumferential direction of the dust cover 6D. The air hole 70d passes through a rubber layer of the inner peripheral part of the dust lip 70 and the reinforcement ring 71 embedded in the dust lip 70. The air hole 70d is for releasing pressures in the seal internal spaces S2 and S8 between a sliding part of the seal lip 62 in the end face seal 6C and a sliding part of the dust lip 70 in the dust cover 6D, toward the atmosphere side. The air hole 70d corresponds to the vent passage described the sixth aspect of the invention and is formed at one part or plural parts in the circumferential direction of the dust cover 6D.

The second dust filter 68B is made of a fiber aggregate such as a synthetic fabric and cotton, and has permeability due to fine spaces among fibers. The second dust filter 68B is formed in annular shape, and is fixed by an adhesive agent or the like, so as to close the air hole 70d at the inner peripheral side of the dust lip 70.

Therefore, according to the above-described structure, the end face seal 6C is to prevent leakage of engine oil in the crank chamber of an engine toward the external of the device through the sliding parts of the seal lip 62 and the flange part 64b of the slinger 64. The dust cover 6D is to prevent to invasion of dusts in the atmosphere into the crank chamber of an engine through the sliding parts of the outer peripheral flange part 61c of the case 61 in the end face seal 6C and the dust lip 70. In addition, the tongue piece part 62b has functions similar to those of the first embodiment described above.

Further, air in the seal internal space S2 of the end face seal 6C is discharged from the sliding parts of the flange part 64b of the slinger 64 and the seal lip 62 toward the outer peripheral side, by centrifugal force occurring at the sliding parts by rotation or by the pumping work of the spiral groove. Further, air in the seal internal space S8 between the end face seal 6C and the dust cover 6D is discharged toward the outer peripheral side by centrifugal force occurring at the sliding part of the dust lip 70 by rotation. However, according to such the air discharging operation, air outside of the device is sucked into the seal internal space S8 through the air hole 70d and the second dust filter 68B. Further, a part of the air sucked into the seal internal space S8 is sucked into the seal internal space S2 of the end face seal 6C through the first dust filter 68A.

Therefore, entirely contacting of the seal lip 62 and the dust lip 70 to the flange part 64b of the slinger 64 and the outer peripheral flange part 61c of the case 61 by the negative pressure can be prevented. Further, since the seal lip 62 and the dust lip 70 have tight contacting force by only bending reaction force in the axial direction, the face pressures are low. Thus, increasing of sliding load, and early abrasions of the seal lip 62 and the dust lip 70 caused by the increasing of sliding load can be effectively prevented. Further, according to this embodiment, the vent passage is consisted of only the air hole 70d of the dust cover 6D, so that the vent hole or the like is unnecessary to be formed at the housing 2.

Further, dusts in the atmosphere outside of the device, which are sucked into the seal internal spaces S8 and S2, are separated by the second dust filter 68B and the first dust filter 68A during the sucking process. Thus, clean air is sucked into the seal internal spaces S8 and S2. Therefore, invasion of dusts into engine oil in the crank chamber through the sliding parts of the flange part of the slinger 64 and the seal lip 62 can be prevented.

The first dust filter 68A is abraded with passage of time by sliding with the fitting cylindrical part 64a of the rotating slinger 64. However, the second dust-filter 68B is not abraded because of being not slid. Therefore, excellent dust removability can be kept.

Figure 9:
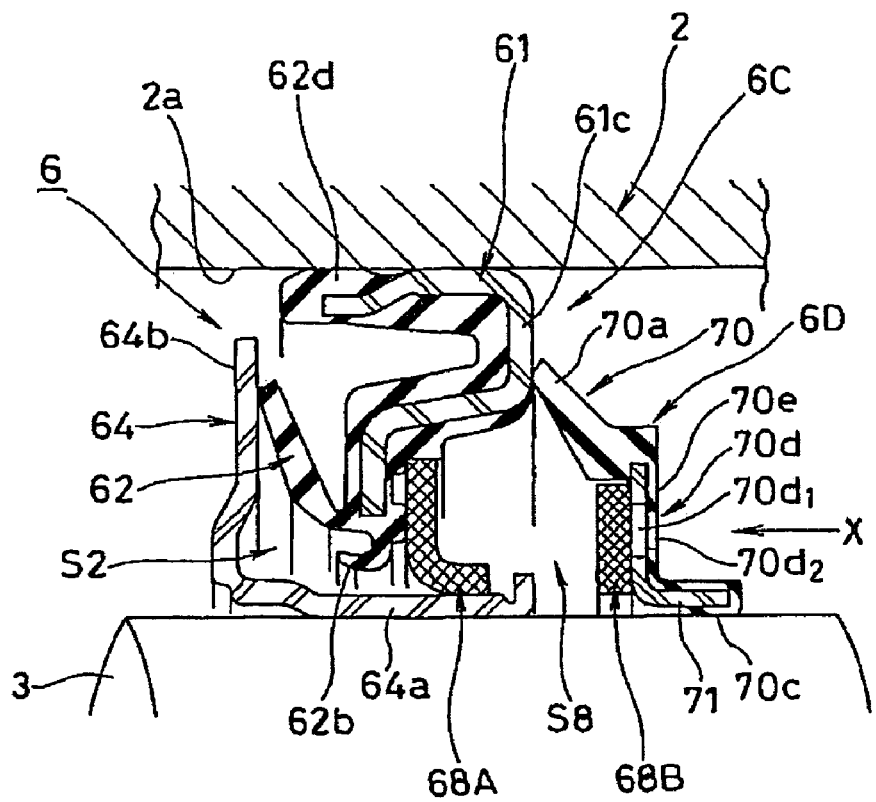
FIG. 9 is a half cross sectional view illustrating an example that a shape of the lip type end face sealing device according to the fifth embodiment is varied by cutting a plane passing a shaft axis.
Figure 10:
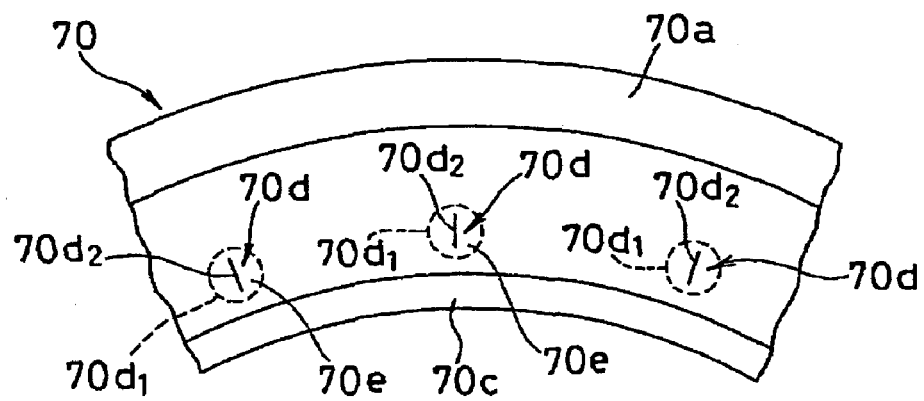
FIG. 10 is a view seen in the X direction in FIG. 9.

FIG. 9 is a half cross sectional view illustrating an example that a shape of the lip type end face sealing device according to the fifth embodiment illustrated in FIG. 8 is varied, by cutting a plane passing a shaft axis. FIG. 10 is a view seen is the X direction in FIG. 9.

In the lip type end face sealing device 6, an air hole 70d of a dust cover 6D is formed in a slit shape as illustrated in FIG. 10, and other portions are similarly constituted as those of FIG. 8. More particularly, as for a rubber layer forming a dust lip 70, a part for covering the atmosphere side of a reinforcement ring 71 is formed to be a comparatively thin film. As for the air hole 70d, although an internal air hole $70d_1$ passing through the reinforcement ring 71 embedded in the dust cover 6D is formed, for example, in a circular hole shape as illustrated with short dashed lines in FIG. 10, an external air hole $70d_2$ passing through a film shaped rubber layer 70e at the atmosphere side is formed in a slit shape.

According to this embodiment, in the air hole 70d of the dust cover 6D, the external air hole $70d_2$ formed at the rubber layer 70e is ordinary closed because of being formed in a slit shape. The external air hole $70d_2$ is operated to be slightly opened when the rubber layer is deformed by the pressure difference between the internal space side and the atmosphere side, which is generated when the pressures in the seal internal spaces S8 and S2 becomes negative. That is, the second dust filter 68B positioned at the inner side of the air hole 70d is not always exposed to external dusts, and invasion of dusts having large particles can be prevented. Therefore, in addition to effects by the embodiment illustrated in FIG. 8, the effects that dust removability can be increased more and the second dust filter 68B is hardly clogged, can be obtained.

Figure 11:
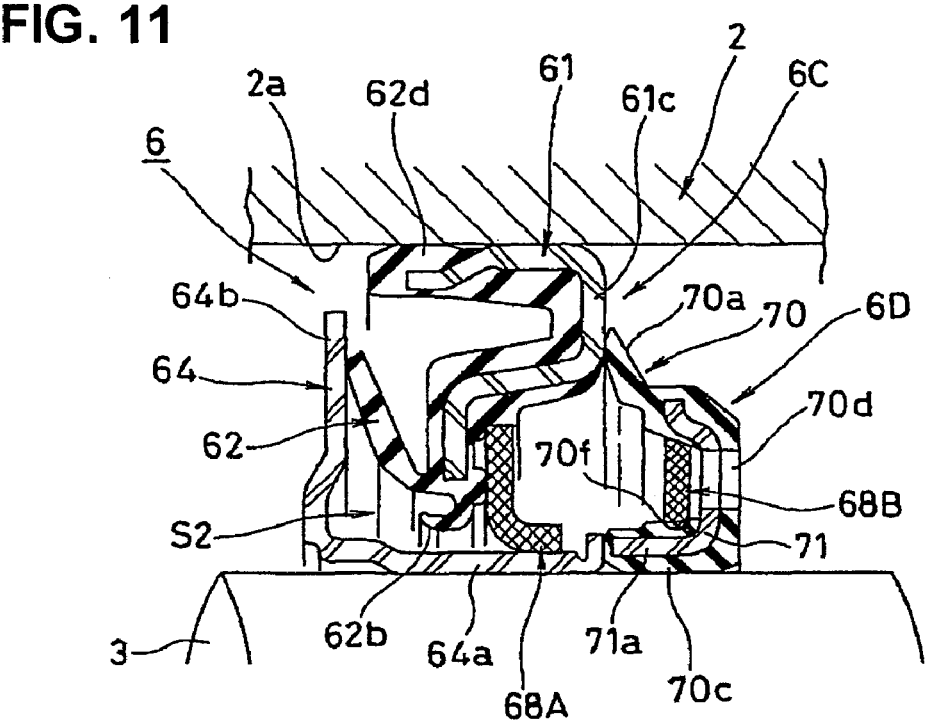
FIG. 11 is a half cross sectional view illustrating another example that a shape of the lip type end face sealing device according to the fifth embodiment is varied, by cutting a plane passing a shaft axis.

FIG. 11 is a half cross sectional view illustrating another example that a shape of the lip type end face sealing device according to the fifth embodiment illustrated in FIG. 8 is varied, by cutting a plane passing a shaft axis.

As for this lip type end face sealing device 6, an inner peripheral basic part 70c of a dust lip 70 in a dust cover 6D is directed to the fitting cylindrical part 64a side of a slinger 64 in an end face seal 6C, and other portions are similarly constituted as those of FIG. 8. The inner peripheral basic part 70c corresponds to the inner peripheral part of the dust cover described in the ninth aspect of the invention.

More particularly, the inner peripheral basic part 70c of the dust lip 70 is tight fitted to an outer peripheral face of a crank shaft 3, and is extended in a cylindrical shape toward the fitting cylindrical part 64a together with an inner peripheral cylindrical part 71a of a reinforcement ring 71 embedded in the dust lip 70. When a top end part of the inner peripheral basic part 70c is contacted with an end part of the fitting cylindrical part 64a, a top end face 70b of a lip main body part 70a of the dust lip 70 is tight contacted with an end face of an outer peripheral flange part 61c of a case 61 in an end face seal 6C with proper face pressure. Further, as for the end face seal 6C, when the device is not mounted, the case 61 (the seal lip 62) and slinger 64 are relatively positioned in the axial direction by a proper auxiliary metal fitting (not illustrated in the drawings) which is detachable.

Further, an outer peripheral face of the inner peripheral basic part 70c of the dust lip 70 has a fitting groove 70f, and an inner peripheral part of a second dust filter 68B is fitted to the fitting groove 70f. That is, the second dust filter 68B is fitted to the fitting groove 70f, so as to be attached to an inner side of an air hole 70d without using an adhesive agent.

Therefore, according to this embodiment, when mounting the dust cover 6D on an outer peripheral face of a crank shaft 3, a top end part of the inner peripheral basic part 70c of the dust lip 70 in the dust cover 6D is contacted with the fitting cylindrical part 64a of the slinger 64. Thereby, the dust cover 6D can be easily positioned so as to make the top end face 70b of the dust lip 70 to be tight contacted with the outer peripheral flange part 61c of the case 61 with the proper face pressure.

Further, also in the embodiment illustrated-in FIG. 11, the air hole 70d can be similarly constituted as the embodiment in FIGS. 9 and 10.

Figure 12:
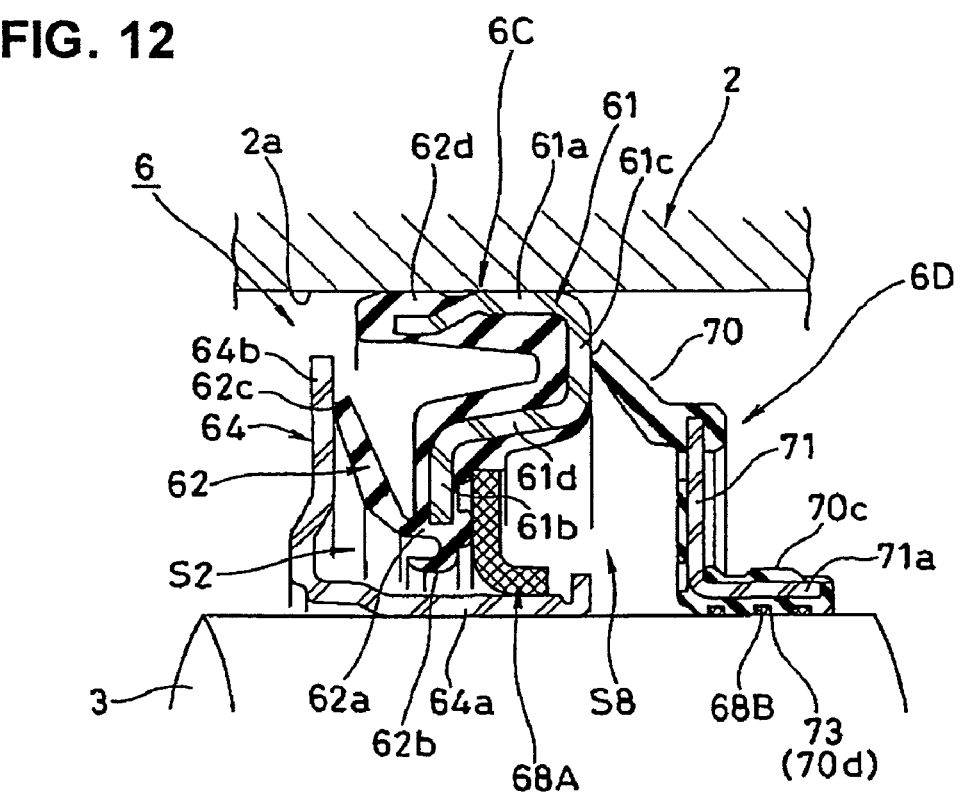
FIG. 12 is a half cross sectional view illustrating another example that a shape of the lip type end face sealing device according to the fifth embodiment is varied, by cutting a plane passing a shaft axis.
Figure 13:
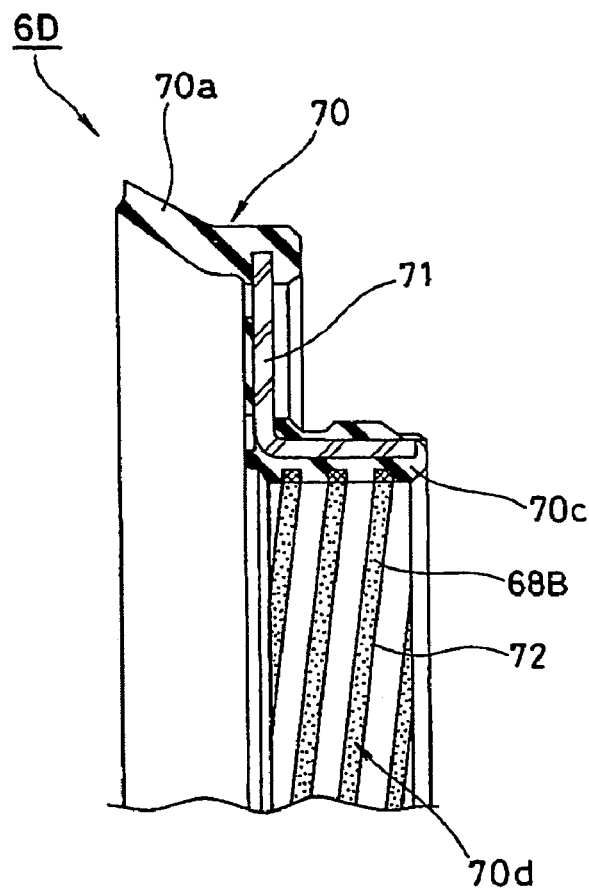
FIG. 13 is a half cross sectional view illustrating a dust cover in FIG. 12, by cutting a plane passing a shaft axis.

FIG. 12 is a half cross sectional view illustrating another example that a shape of the lip type end face sealing device according to the fifth embodiment illustrated in FIG. 8 is varied, by cutting a plane passing a shaft axis. FIG. 13 is a half cross sectional view illustrating a dust cover in FIG. 12 by cutting a plane crossing a shaft axis.

In the lip type end face sealing device 6, the air hole 70d is spirally extended along a fitting part of an inner peripheral basic part 70c of a dust cover 6D to a crank shaft 3, and other portions are basically constituted similarly to those in FIG. 8.

More particularly, as illustrated in FIG. 13, the dust cover 6D has grooves (hereinafter, it is said to as spiral grooves) on an inner peripheral face of the inner peripheral basic part 70c tight fitted to an outer peripheral face of the crank shaft 3, where the grooves are spirally continued between an end part at the atmosphere side and an end part at the seal internal space S8 side. The spiral grooves 72 are filled with a second dust filter 68B. The second dust filter 68B is made of a fiber aggregate such as a synthetic fabric and cotton or a felt, and has permeability due to fine spaces among fibers. Further, the second dust filter 68B is fixed with an adhesive agent or the like.

The end face seal 6C has the same structure as that in FIG. 8, and is to prevent leakage of engine oil in a crank chamber of an engine toward the outside of the device through sliding parts of a seal lip 62 and a flange part 64b of a slinger 64. Air in the seal internal space S2 of the end face seal 6C is discharged from the sliding parts of the flange part 64b of the slinger 64 and the seal lip 62 toward the outer peripheral side, by centrifugal force occurring at the sliding parts by rotation and pumping work of the spiral grooves formed at the sliding parts. Further, air in the seal internal space S8 between the end face seal 6C and the dust cover 6D is discharged toward the outer peripheral side by centrifugal force occurring at the sliding part of the dust lip 70 by rotation. Further, according to such the air discharge operation, air outside the device is sucked into the seal internal space S8 through an air hole 70d including the spiral grooves 72 and the second dust filter 68B filled in the spiral grooves 72. Furthermore, a part of the air sucked into the seal internal space S8 is sucked into the seal internal space S2 of the end face seal 6C through the first dust filter 68A.

Therefore, entirely contacting of the seal lip 62 and the dust lip 70 to the flange part 64b of the slinger 64 and the outer peripheral flange part 61c of the case 61 by negative pressure can be prevented, and increasing of sliding load and early abrasions of the seal lip 62 and the dust lip 70 caused by the increasing of sliding load can be effectively prevented.

Further, dusts in the atmosphere outside of the device, which are sucked into the seal internal spaces S8 and S2, are separated by the second dust filter 68B and the first dust filter 68A during the sucking process. In addition, the air hole 70d formed at the inner peripheral basic part 70c of the dust cover 6D and the second dust filter 68B filled in the air hole 70d are spirally extended long, so that dust removing effect is increased. Thus, only clean air is sucked into the seal internal spaces S8 and S2. Therefore, invasion of dusts into engine oil in the crank chamber through the sliding parts of the flange part of the slinger 64 and the seal lip 62 can be prevented.

In addition, the second dust filter 68B is properly compressed by an interference of the inner peripheral basic part 70c of the dust cover 6D with respect to the crank shaft 3, so that the density of the fibers may be somewhat rough.

Figure 14:
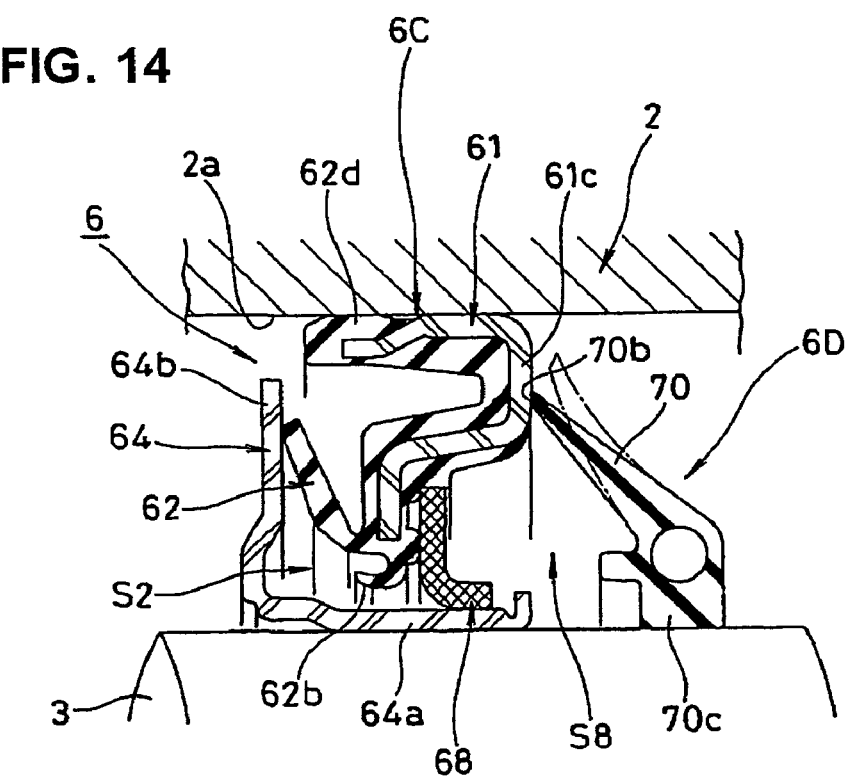
FIG. 14 is a half cross sectional view illustrating a lip type end face sealing device according to a sixth embodiment of the present invention, by cutting a plane passing a shaft axis.

FIG. 14 is a half cross sectional view illustrating a lip type end face sealing device according to a sixth embodiment of the present invention, by cutting a plane passing a shaft axis, where the lip type end face sealing device is applied as a sealing means between engine oil in an engine and atmosphere under severe external dust conditions. An end face seal 6C is similarly constituted to that of FIG. 8.

A dust cover 6D is similar to the seal lip 62 in the end face seal 6C, and made of a rubber like elastic material in an annular shape. An inner peripheral face of a thick basic part 70c of the dust cover 6D is tight fitted to an outer peripheral face of a crank shaft 3 at the atmosphere side from a fitting cylindrical part 64a in a slinger 64. Further, a top end face 70b of a dust lip 70 opened toward the end face seal 6C side in a tapered shape is slidably tight contacted with an end face of an outer peripheral flange part 61c of a case 61 in the end face seal 6C.

Centrifugal force by rotation applied to the dust cover 6D rotated with the crank shaft 3 so as to deform the dust lip 70 to enlarge a diameter thereof. Further, rigidity and mass of the dust lip 70 is set so as to separate the top end face 70b of the dust lip 70, which the dust lip is deformed to have the enlarged diameter by increasing of centrifugal force, from the end face of the outer peripheral flange part 61c of the case 61 in the end face seal 6C when the rotation reaches a predetermined rotation rate or more. This state is illustrated with dashed lines in FIG. 14.

According to the above-described structure, the end face seal 6C is to prevent leakage of engine oil in a crank chamber of an engine toward the outside of the device through sliding parts of the seal lip 62 and a flange part 64b of the slinger 64, like the embodiment of FIG. 8. In this case, at the low rotation rate, the centrifugal force, which is applied so as to deform to enlarge the diameter of the dust lip 70 of the dust cover 6D rotated with the crank shaft 3, is small and centrifugal force applied to air in seal internal spaces S2 and S8 is small. Therefore, large air discharging force to push and open the seal lip 62 and the dust lip 70 does not occur, so that the pressures in seal internal spaces S2 and S8 become hardly negative. Further, the dust lip 70 is slidably tight contacted with the end face of the outer peripheral flange part 61c of the case 61 in the end face seal 6C, so as to prevent invasion of dusts from the atmosphere side.

Further, when the rotation rate of the crank shaft 3 is increased from this state, the air discharging force at the sliding parts of the seal lip 62 and the flange part 64b of the slinger 64 is increased by the centrifugal force applied to air, or by pumping work of spiral grooves formed at the sliding parts. The centrifugal force applied to the dust lip 70 of the dust cover 6D rotated with the crank shaft 3 is also increased. Thus, the dust lip 70 is deformed as illustrated with dashed lines in FIG. 14, and the top end face 70b is slightly separated from the end face of the outer peripheral flange part 61c of the case 61 in the end face seal 6C, so that the pressures in the seal internal spaces S2 and S8 are prevented to become negative. Therefore, entirely contacting of the seal lip 62 and the dust lip 70 to the flange part 64b of the slinger 64 and the outer peripheral flange part 61c of the case 61 by the negative pressure can be prevented. So, increasing of sliding load and early abrasions of the seal lip 62 and the dust lip 70 caused by the increasing of sliding load can be effectively prevented.

Further, in this state, air outside the device is sucked into the seal internal space S8 through a slight space formed between the top end face 70b of the dust lip 70 and the outer peripheral flange part 61c of the case 61, and is sucked into the seal internal space S2 of the end face seal 6C. However, dusts contained in the air are separated by a dust filter 68. Therefore, only clean air is sucked into the seal internal space S2, so that invasion of dusts into engine oil in the crank chamber through the sliding parts of the flange part 64b of the slinger 64 and the seal lip 62 can be prevented.

In addition, in order to certainly generate the above-described operation for the dust lip 70, for example, it is considered to employ means that weights for increasing diameter enlarging force by centrifugal force are embedded in the outer peripheral part of the dust lip 70 at equal intervals in the circumferential direction, or that thin parts for easily enlarging the diameter of the dust lip 70 are formed at the dust lip 70 at predetermined intervals in the circumferential direction.

Figure 15:
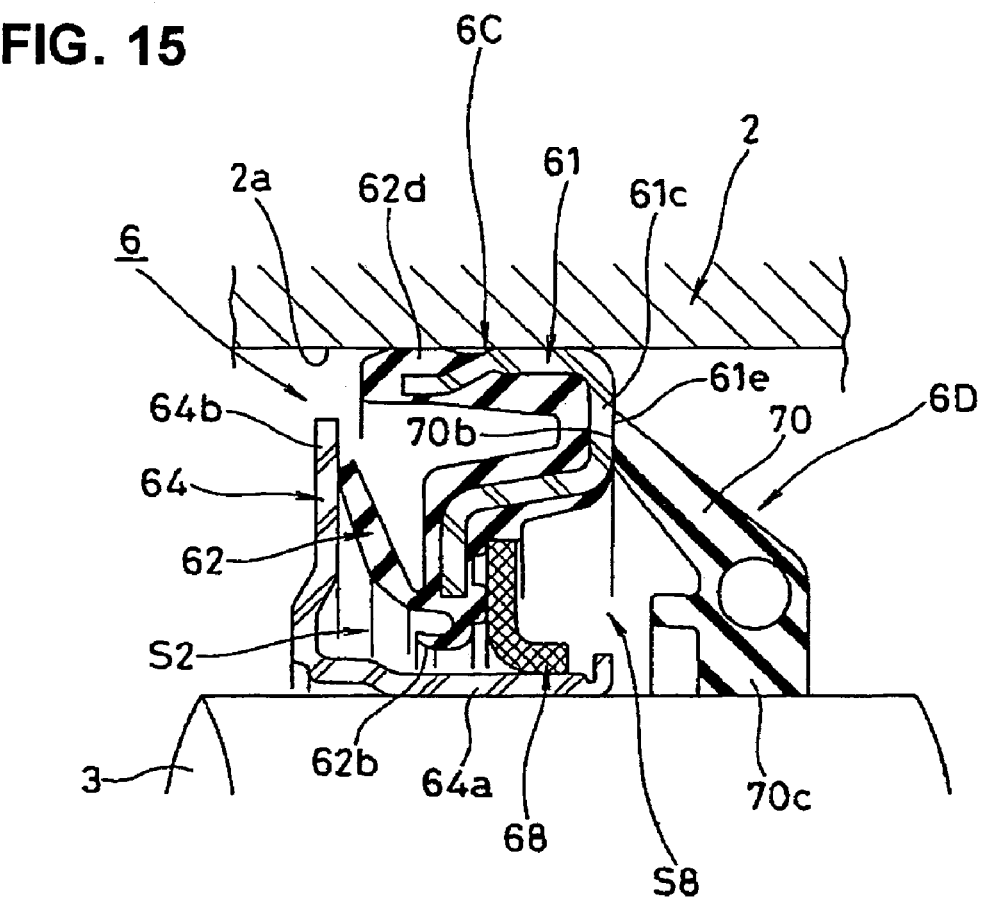
FIG. 15 is a half cross sectional view illustrating a lip type end face sealing device according to a seventh embodiment of the present invention, by cutting a plane passing a shaft axis.
Figure 16:
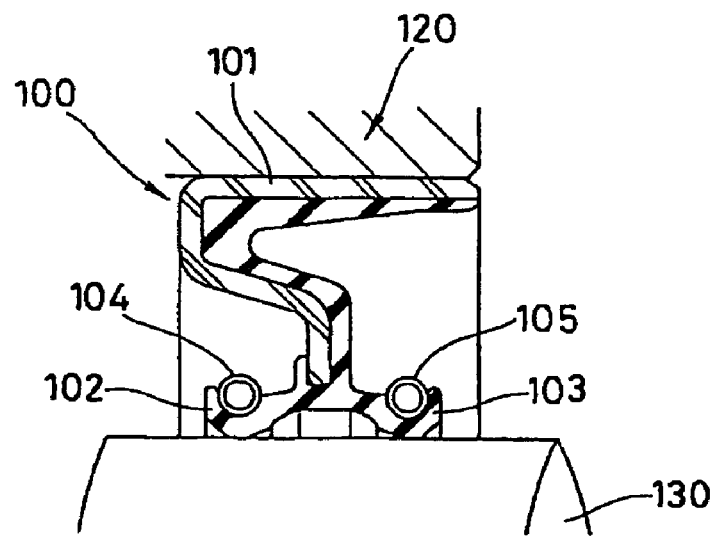
FIG. 16 is a half cross sectional view illustrating a conventional lip type end face sealing device.

FIG. 15 is a half cross sectional view illustrating a lip type end face sealing device according to a seventh embodiment of the present invention, by cutting a plane passing a shaft axis, where the lip type end face sealing device is applied as a sealing means between engine oil and atmosphere in an engine under severe external dust conditions. An end face seal 6C is constituted similarly to that of FIG. 8.

A dust cover 6D is basically similar to that in FIG. 14. An inner peripheral face of a thick basic part 70c is positioned at the atmosphere side from a fitting cylindrical part 64a in a slinger 64, and is tight fitted to an outer peripheral face of a crank shaft 3. A top end face 70b of a dust lip 70 opened toward the end face seal 6C side in a tapered shape is slidably tight contacted with an end face of an outer peripheral flange part 61c of the case 61 in the end face seal 6C. Further, the dust lip 70 is thicker than that in FIG. 14 described above. Therefore, sliding width of an end face 61e of the outer peripheral flange part 61c of the case 61 in the end face seal 6C, that is, a diameter directional width of the top end face 70b of the dust lip 70 is comparatively large.

Any one or both of the end face 61e of the outer peripheral flange part 61c of the case 61 in the end face seal 6C and the top end face 70b of the dust lip 70 slidably contacted with the end face 61e are processed with a surface roughening treatment by embossing. Therefore, countless fine labyrinth-shaped vent passages (not illustrated in the drawings) are formed between the end face 61e and the top end face 70b contacted each other.

According to the above-described structure, the end face seal 6C is to prevent leakage of engine oil in a crank chamber of an engine toward the outside of the device through sliding parts of the seal lip 62 and a flange part 64b of the slinger 64, like the embodiment of FIG. 8. Further, air in a seal internal space S2 is discharged toward the outer peripheral side from the sliding parts of the flange part 64b of the slinger 64 and the seal lip 62, by centrifugal force working at the sliding parts by rotation, or by pumping work of spiral grooves formed at the sliding parts. However, the seal internal space S2 is opened to the atmosphere side through a dust filter 68, the seal internal space S8 at the inner side of the dust cover 6D, and the countless labyrinth-shaped vent passages, which is formed by the surface roughening treatment at the sliding parts of the end face 60e of the outer peripheral flange part 61c of the case 61 and the top end face 70b of the dust lip 70. Thus, the remarkably negative pressure is not generated in the seal internal spaces S2 and S8 by the air discharging operation. Therefore, entirely contacting of the seal lip 62 and the dust lip 70 to the flange part 64b of the slinger 64 and the outer peripheral flange part 61c of the case 61 by the negative pressure can be prevented. So, increasing of sliding load and early abrasions of the seal lip 62 and the dust lip 70 caused by the increasing of sliding load can be effectively prevented.

Further, according to the above-described air discharging operation, air outside the device is sucked into the seal internal space S8 at the inner side of the dust cover 6D through the countless labyrinth-shaped vent passages at the sliding parts of the end face 61e of the outer peripheral flange part 61c of the case 61 and the top end face 70b of the dust lip 70. In this case, the vent passages are formed by the embossing treatment to be fine, and are formed in the labyrinth shape. So, dusts contained in the sucked air cannot easily pass to the seal internal space S8. Further, even if dusts are contained in the air sucked into the seal internal space S8, the dusts are separated by the dust filter 68 during a process of sucking the air into the seal internal space S2 of the end face seal 6C. Therefore, only clean air is sucked into the seal internal space S2, so that invasion of dusts into engine oil in the crank chamber through the sliding parts of the flange part 64b of the slinger 64 and the seal lip 62 can be prevented.

The present invention can be preferably carried out in a lip type end face sealing device for sealing by tight contact of a seal lip to an end face, such as a sealing device for sealing between engine oil and clutch oil in a wet type engine.

What is claimed is:
1. A sealing device comprising:
   a seal lip being integrally provided at an annular case arranged to be fixed on an inner peripheral face of a housing, the seal lip being opened in a tapered shape to the sealed liquid side;

a slinger arranged to be tight fitted to an outer periphery of a rotary shaft inserted in the inner periphery of the housing and being slidably contacted with the seal lip at a flange part; and a dust cover arranged to be tight fitted on the outer periphery of the rotary shaft so as to be positioned at an atmosphere side of the slinger, and having a dust lip slidably contacted with the case at an outer periphery side of the dust cover, wherein the dust cover comprises a vent passage for releasing pressure in a seal internal space between sliding parts of the seal lip and the dust lip to the atmosphere side, and a dust filter provided in the vent passage; and the vent passage spirally extends along a fitting part to the rotary shaft in an inner peripheral part of the dust cover.

2. The sealing device as claimed in claim 1, wherein the vent passage is formed in a slit shape at a portion passing through a rubber layer.

3. The sealing device as claimed in claim 1, wherein positioning of the inner peripheral part of the dust cover is decided by contacting to an end face of the slinger at the atmosphere side.

4. The sealing device as claimed in claim 1, wherein the vent passage is ordinarily closed.

5. The sealing device as claimed in claim 4, wherein the ordinarily closed vent passage is opened by a pressure difference between opposite sides of the vent passage.

6. The sealing device as claimed in claim 4, wherein the vent passage is formed in a slit shape at a portion passing through a rubber layer.

7. The sealing device as claimed in claim 1, wherein the dust filter is located in and extends along the spirally extending vent passage.

* * * * *